United States Patent
Hasegawa et al.

(10) Patent No.: US 10,375,360 B2
(45) Date of Patent: Aug. 6, 2019

(54) STATE ESTIMATION APPARATUS, STATE ESTIMATION METHOD, INTEGRATED CIRCUIT, AND NON-TRANSITORY COMPUTER-READABLE STORAGE MEDIUM

(71) Applicants: MegaChips Corporation, Osaka-shi (JP); Kyushu Institute of Technology, Kitakyushu-shi (JP)

(72) Inventors: Hiromu Hasegawa, Osaka (JP); Norikazu Ikoma, Fukuoka (JP)

(73) Assignees: MEGACHIPS CORPORATION, Osaka-shi (JP); KYUSHU INSTITUTE OF TECHNOLOGY, Kitakyushu-shi (JP)

( * ) Notice: Subject to any disclaimer, the term of this patent is extended or adjusted under 35 U.S.C. 154(b) by 578 days.

(21) Appl. No.: 14/950,302

(22) Filed: Nov. 24, 2015

(65) Prior Publication Data

US 2016/0171717 A1 Jun. 16, 2016

(30) Foreign Application Priority Data

Dec. 11, 2014 (JP) ................................. 2014-250985

(51) Int. Cl.
- H04N 7/18 (2006.01)
- G06T 7/277 (2017.01)
- G06T 7/292 (2017.01)

(52) U.S. Cl.
CPC ............. *H04N 7/181* (2013.01); *G06T 7/277* (2017.01); *G06T 7/292* (2017.01); *G06T 2207/10016* (2013.01); *G06T 2207/20076* (2013.01); *G06T 2207/30244* (2013.01)

(58) Field of Classification Search
CPC ..................... G06T 7/292; G06T 7/277; G06T 2207/30244; G06T 2207/10016; G06T 2207/20076; H04N 7/181
See application file for complete search history.

(56) References Cited

U.S. PATENT DOCUMENTS

| | | | | |
|---|---|---|---|---|
| 2007/0147661 A1* | 6/2007 | Fukaya | ............. | G06K 9/00248 382/104 |
| 2011/0029278 A1* | 2/2011 | Tanigawa | ............. | G01S 5/0294 702/150 |

(Continued)

FOREIGN PATENT DOCUMENTS

| | | |
|---|---|---|
| JP | 2012-234466 | 11/2012 |
| JP | 2014-206907 | 10/2014 |
| WO | WO 2014/171212 A1 | 10/2014 |

OTHER PUBLICATIONS

Wang et al. "On pedestrian detection and tracking in infrared videos." Pattern Recognition Letters. 33. 775-785. Apr. 2012. (Year: 2012).*

(Continued)

*Primary Examiner* — Joseph G Ustaris
*Assistant Examiner* — Jill D Sechser
(74) *Attorney, Agent, or Firm* — Oblon, McClelland, Maier & Neustadt, L.L.P.

(57) ABSTRACT

A state estimation apparatus obtains observation data sets for a tracking target object, and estimates an internal state of the object using likelihoods obtained from the observation data sets and the reliability of each observation data set. A first observation obtaining unit obtains first observation data. A second observation obtaining unit obtains second observation data. A first likelihood obtaining unit obtains a first likelihood based on the first observation data. A second likelihood obtaining unit obtains a second likelihood based on the second observation data. A likelihood combining unit obtains a combined likelihood based on the first and second likelihoods, first reliability data indicating the reliability of the first observation data, and second reliability data indicating the reliability of the second observation data. A posterior probability distribution obtaining unit obtains posterior probability distribution data indicating a probability (Continued)

distribution of the internal state of the observation target at current time t from the combined likelihood and predictive probability distribution data.

9 Claims, 24 Drawing Sheets

(56) References Cited

U.S. PATENT DOCUMENTS

2012/0316845 A1* 12/2012 Grey ............... G06Q 10/06398
  703/2
2014/0275886 A1* 9/2014 Teixeira ............... A61B 5/0205
  600/324

OTHER PUBLICATIONS

Wang et al. (2013). "Particle Filter Algorithm for Object Tracking Based on Color Local Entropy." Advances in Mechanical Engineering. (Year: 2013).*

Dou et al. (2014). "Robust visual tracking base on adaptively multi-feature fusion and particle filter." Optik—International Journal for Light and Electron Optics. 125. 1680-1686. (Year: 2014).*
Combined Chinese Office Action and Search Report dated Nov. 24, 2017 in Chinese Patent Application No. 201510820272.0 (with English translation).
U.S. Appl. No. 14/881,652, filed Oct. 13, 2015, Norikazu Ikoma et al.
Extended European Search Report dated May 11, 2016 in Patent Application No. 15195370.0.
European Office Action dated Jan. 4, 2017 in Patent Application No. 15195370.0.
Combined Office Action and Search Report dated Jul. 20, 2018 in Chinese Patent Application No. 201510820272.0 (with English translation of categories of cited documents), 9 pages.
Office Action dated Oct. 30, 2018 in Japanese Patent Application No. 2014-250985 with unedited computer generated English translation, 9 Pages.
Tao Zhang, et al., "Target tracking based on particle filter algorithm with multiple cues fusion", The 26th Chinese Control and Decision Conference (2014 CCDC), IEEE, May 31-Jun. 2, 2014, 9 Pages.

* cited by examiner

000# STATE ESTIMATION APPARATUS, STATE ESTIMATION METHOD, INTEGRATED CIRCUIT, AND NON-TRANSITORY COMPUTER-READABLE STORAGE MEDIUM

This application claims priority to Japanese Patent Application No. 2014-250985 filed on Dec. 11, 2014, the entire disclosure of which is hereby incorporated herein by reference (IBR).

BACKGROUND OF THE INVENTION

Field of the Invention

The present invention relates to a technique for estimating the state of an observable event using time-series filtering, and particularly to, for example, a technique for tracking objects in a moving image using time-series filtering.

Description of the Background Art

Techniques for estimating the internal state of an observation target, changing from moment to moment, may use time-series filtering. With a state vector $x_t$ indicating the internal state of an object at time t and an observation vector $y_t$ indicating a feature observed at time t, time-series filtering enables an internal state $x_t$ of a directly unobservable object to be estimated using the observation vector $y_t$ obtained through observation.

More specifically, time-series filtering is a technique for determining a conditional probability distribution $p(x_t|y_{1:t})$ of a state series $x_{0:t} = \{x_0, x_1, \ldots, x_t\}$ using the state space models below, when an observation series (a set of observation vectors up to time t) $y_{1:t} = \{y_1, y_2, \ldots, y_t\}$ is given.

System model: $x_t \sim f(x_t|x_{t-1})$
Observation model: $y_t \sim h(y_t|x_t)$ With a system noise $v_t$ and an observation noise $w_t$, the system model showing the internal state of an object and the observation model formed by observing the object can be expressed as follows:

the system model showing the internal state of an object:
$x_t = f(x_{t-1}, v_t)$
the observation model formed by observing the object:
$y_t = h(x_t, w_t)$
where $f(x_{t-1}, v_t)$ is a state transition function indicating a change in states between time t−1 and time t, and $h(x_t, w_t)$ is an observation vector obtained in the state $x_t$.

In this case, the one-step ahead prediction is written as the formula below.

$$p(x_t|y_{1:t-1}) = \int p(x_{t-1}|y_{1:t-1}) f(x_t|x_{t-1}) dx_{t-1} \quad \text{Formula 1}$$

Based on Bayes' Law, the posterior probability distribution $p(x_t|y_{1:t})$ at time t is written as the formula below.

$$p(x_t \mid y_{1:t}) = \frac{h(y_t \mid x_t) p(x_t \mid y_{1:t-1})}{p(y_t \mid y_{1:t-1})} \quad \text{Formula 2}$$

In this formula, $h(y_t|x_t)$ is a likelihood (a probability for obtaining an observation vector $y_t$ in the state $x_t$), and $p(x_t|y_{1:t-1})$ is a predictive probability distribution.

One practical example of time-series filtering is particle filtering. Particle filters represent the distribution of probabilities of the internal state of an observation target as the distribution of particles, and use the distribution of posterior probabilities of the state at the current time step as the distribution of prior probabilities of the state at the next time step. With particle filtering, the likelihood is calculated by comparing a template observation estimated from the state of particles indicating the distribution of prior probabilities (a set of samples generated in accordance with the prior probability distribution) (predictive samples) with an actual image (an actual observation) obtained at the next time step.

Particle filtering estimates the posterior probability distribution of particles from the calculated likelihoods and the prior probability distribution.

Particle filtering uses the above processing performed repeatedly at each subsequent time step to successively estimate the dynamically changing state of an observation target (e.g., a tracking target).

Particle filtering involves the processing (1) to (4) below, in which M is the number of particles (M is a natural number) and $1 \leq i \leq M$ (i is an integer).

(1) Generating Particles (One-Step Ahead Prediction)

For each sample (each particle), the processing corresponding to the formula below is performed to generate a predictive sample at time t. More specifically, the probability distribution predicted in accordance with the system model (state transition function) is obtained from the posterior probability distribution at time t−1 (the probability distribution of the internal state of an observation target at time t−1). In more detail, each predictive sample is generated from the corresponding sample (particle) at time t−1 through transition in accordance with the system model f.

$$xa_t^{(i)} \sim f(x_t | x_{t-1}^{(i)})$$

$$xa_t = \{xa_t^{(1)}, xa_t^{(2)}, xa_t^{(3)}, \ldots, xa_t^{(M)}\}$$

where $xa_t$ is a predictive (estimated) vector of a state vector $x_t$ calculated by a state transition function $f(\ )$.

(2) Calculating Weights (Calculating Likelihoods)

For each predictive sample generated in processing (1), the processing corresponding to the formula below is performed to calculate a weight (likelihood). More specifically, the probability (likelihood) to obtain the observation vector yt is estimated in accordance with the observation model h.

$$wa_t^{(i)} \sim h(y_t | x_{at}^{(i)})$$

$$wa_t = \{wa_t^{(1)}, wa_t^{(2)}, wa_t^{(3)}, \ldots, wa_t^{(M)}\}$$

where $wa_t$ is a predictive (estimated) vector of a weight (likelihood) $w_t$ (a set of predictive likelihoods) calculated by a function ho.

(3) Resampling

At the ratio proportional to the weight (likelihood) $wa_t^{(i)}$, M particles are sampled without changing the total number of the particles (the particle $xa_t^{(i)}$ is sampled). The posterior probability distribution at time t (the probability distribution of the internal state of the observation target at time t) is obtained from the sampled M particles.

(4) The time t is incremented by one step, and the processing returns to (1). The posterior probability distribution obtained in processing (3) (the posterior probability distribution at time t) is used as the prior probability distribution at the next time step (time t+1).

As described above, particle filtering allows the estimation of parameters indicating the changing state of the observation target, changing from moment to moment, by alternately predicting the prior probability distribution of parameters indicating the state of the observation target and calculating the posterior probability distribution. Such particle filtering may be used in tracking the position of an object in a moving image. In tracking the position of an object with particle filtering, parameters indicating the position of an object may include parameters indicating the state of a tracking target (an example of an observation target). Particle filtering includes comparing observations estimated from parameters indicating the position of the object (predictive samples) with actual observations (e.g., an image captured by a camera) to calculate likelihoods, and resampling particles based on the calculated likelihoods to obtain the posterior probability distribution of parameters indicating the state of the observation target (see, for example, Patent Literature 1: Japanese Unexamined Patent Publication No. 2012-234466).

The techniques known in the art use single observation data in tracking an object. When, for example, the environment for obtaining observation data changes, appropriate observation data may not be obtained in a stable manner with these techniques, and the internal state of an object may not be estimated appropriately. Further, the techniques for tracking an object using single observation data in tracking an object may have difficulties in detecting and tracking various objects in an appropriate manner.

The techniques known in the art may also have difficulties in estimating the internal state of a tracking target object appropriately if observation data contains noise, or if an error or abnormality occurs in obtaining observation data.

In response to the above problems, it is an object of the present invention to provide a state estimation apparatus, a program, and an integrated circuit that enable more accurate and robust detection and tracking of an object by obtaining a plurality of sets of observation data for a tracking target object and estimating the internal state of the object using a plurality of likelihoods calculated from the obtained sets of observation data and the reliability of each of the obtained sets of observation data.

SUMMARY

In response to the above problems, a first aspect of the invention provides a state estimation apparatus for estimating an internal state of an observation target. The apparatus includes a first observation obtaining unit, a second observation obtaining unit, a prior probability distribution prediction unit, a first likelihood obtaining unit, a second likelihood obtaining unit, a likelihood combining unit, and a posterior probability distribution obtaining unit.

The first observation obtaining unit obtains first observation data from an observable event at predetermined time intervals.

The second observation obtaining unit obtains second observation data from the observable event at predetermined time intervals.

The prior probability distribution prediction unit performs prediction using, as prior probability distribution data at current time t, posterior probability distribution data obtained at preceding time t−1 indicating a probability distribution of an internal state of an observation target to obtain predictive probability distribution data indicating a probability distribution of the internal state of the observation target at the current time t.

The first likelihood obtaining unit obtains a first likelihood based on the first observation data.

The second likelihood obtaining unit obtains a second likelihood based on the second observation data.

The likelihood combining unit obtains a combined likelihood based on the first likelihood, the second likelihood, first reliability data indicating reliability of the first observation data, and second reliability data indicating reliability of the second observation data.

The posterior probability distribution obtaining unit obtains posterior probability distribution data indicating a probability distribution of the internal state of the observation target at the current time t from the combined likelihood and the predictive probability distribution data.

DESCRIPTION OF THE PREFERRED EMBODIMENTS

First Embodiment

Figure 1:
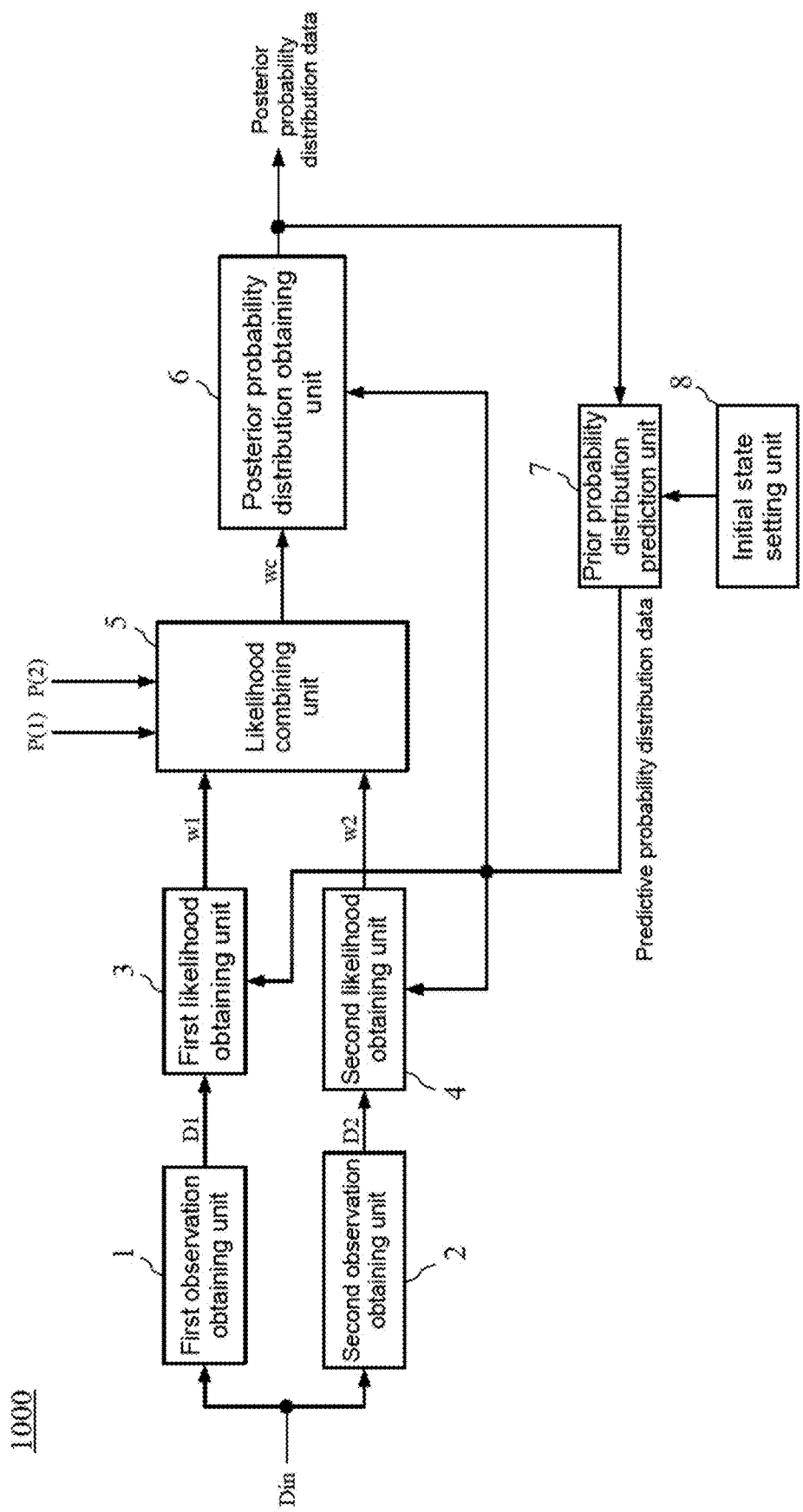
FIG. 1 is a schematic block diagram of a state estimation apparatus 1000 according to a first embodiment.

A first embodiment will now be described with reference to the drawings.
1.1 Structure of State Estimation Apparatus
FIG. 1 is a schematic block diagram of a state estimation apparatus 1000 according to the first embodiment.

As shown in FIG. 1, the state estimation apparatus 1000 includes a first observation obtaining unit 1, a second observation obtaining unit 2, a first likelihood obtaining unit 3, a second likelihood obtaining unit 4, a likelihood combining unit 5, a posterior probability distribution obtaining unit 6, a prior probability distribution prediction unit 7, and an initial state setting unit 8.

The first observation obtaining unit 1 receives input data Din. The first observation obtaining unit 1 obtains first observation data D1 from the input data Din, and outputs the obtained first observation data D1 to the first likelihood obtaining unit 3. The input data Din obtained by the first observation obtaining unit 1 is, for example, an image captured by an imaging apparatus (captured image). The first observation data D1 obtained by the first observation obtaining unit 1 is an extracted-feature image, which is an image representing a predetermined image feature quantity extracted from the input data Din.

The second observation obtaining unit 2 receives the input data Din. The second observation obtaining unit 2 obtains second observation data D2 from the input data Din, and outputs the obtained second observation data D2 to the second likelihood obtaining unit 4. The input data Din obtained by the second observation obtaining unit 2 is, for example, an image captured by the imaging apparatus (captured image). The second observation data D2 obtained by the second observation obtaining unit 2 is an extracted-feature image, which is an image representing a predetermined image feature quantity extracted from the input data Din.

The first likelihood obtaining unit 3 receives the first observation data D1 output from the first observation obtaining unit 1 and predictive probability distribution data output from the prior probability distribution prediction unit 7. The first likelihood obtaining unit 3 obtains a first likelihood w1 based on the first observation data D1 and the predictive probability distribution data. The first likelihood obtaining unit 3 outputs the obtained first likelihood w1 to the likelihood combining unit 5.

The second likelihood obtaining unit 4 receives the second observation data D2 output from the second observation obtaining unit 2 and the predictive probability distribution data output from the prior probability distribution prediction unit 7. The second likelihood obtaining unit 4 obtains a second likelihood w2 based on the second observation data D2 and the predictive probability distribution data. The second likelihood obtaining unit 4 outputs the obtained second likelihood w2 to the likelihood combining unit 5.

The likelihood combining unit 5 receives the first likelihood w1 output from the first likelihood obtaining unit 3 and the second likelihood w2 output from the second likelihood obtaining unit 4. The likelihood combining unit 5 also receives reliability data P(1) indicating the reliability of the observation data obtained by the first observation obtaining unit 1 and reliability data P(2) indicating the reliability of the observation data obtained by the second observation obtaining unit 2. The likelihood combining unit 5 obtains a combined likelihood wc based on the first likelihood w1, the second likelihood w2, and the reliability data P(1) and the reliability data P(2). The likelihood combining unit 5 outputs the resultant combined likelihood wc to the posterior probability distribution obtaining unit 6.

The posterior probability distribution obtaining unit 6 receives the combined likelihood wc output from the likelihood combining unit 5 and the predictive probability distribution data output from the prior probability distribution prediction unit 7. The posterior probability distribution obtaining unit 6 obtains (estimates) posterior probability distribution data based on the combined likelihood wc and the predictive probability distribution data. The posterior probability distribution obtaining unit 6 outputs the obtained posterior probability distribution data to the prior probability distribution prediction unit 7.

The prior probability distribution prediction unit 7 receives the initially set data output from the initial state setting unit 8 and the posterior probability distribution data output from the posterior probability distribution obtaining unit 6. In the initial state, the prior probability distribution prediction unit 7 generates prior probability distribution data based on the initially set data output from the initial state setting unit 8, and outputs the generated prior probability distribution data to the first likelihood obtaining unit 3, the second likelihood obtaining unit 4, and the posterior probability distribution obtaining unit 6 as the predictive probability distribution data.

In states other than the initial state, the prior probability distribution prediction unit 7 obtains, from the posterior probability distribution data at time t output from the posterior probability distribution obtaining unit 6, the probability distribution data predicted in accordance with the system model (state transition function). The prior probability distribution prediction unit 7 outputs the obtained probability distribution data to the first likelihood obtaining unit 3, the second likelihood obtaining unit 4, and the posterior probability distribution obtaining unit 6 as the predictive probability distribution data at the next time t+1.

The initial state setting unit 8 stores data (the initial value) for generating the prior probability distribution (the prior probability distribution data) in the initial state, and outputs the data (the initial value) to the prior probability distribution prediction unit 7.

1.2 Operation of State Estimation Apparatus

The operation of the state estimation apparatus 1000 with the above-described structure will now be described.

In the example described below, the input data Din is a moving image captured by an imaging apparatus (not shown) (captured moving image). The first observation data obtained by the first observation obtaining unit 1 is an extracted-feature image representing an area corresponding to a person extracted from the input data Din. The second observation data obtained by the second observation obtaining unit 2 is an extracted-feature image representing an area corresponding to a moving object extracted from the input data Din.

Figure 2:
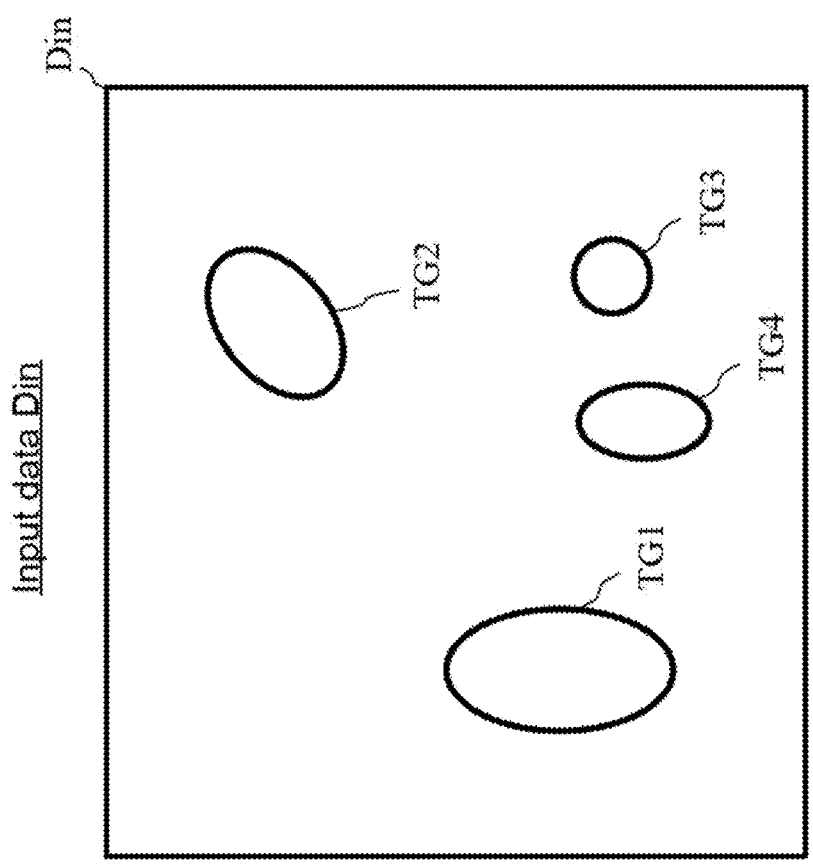
FIG. 2 is a schematic diagram showing input data Din, which is a moving image captured by an imaging apparatus (not shown) (captured moving image).

FIG. 2 is a schematic diagram showing the input data Din, which is a moving image captured by the imaging apparatus (not shown) (captured moving image).

Figure 3:
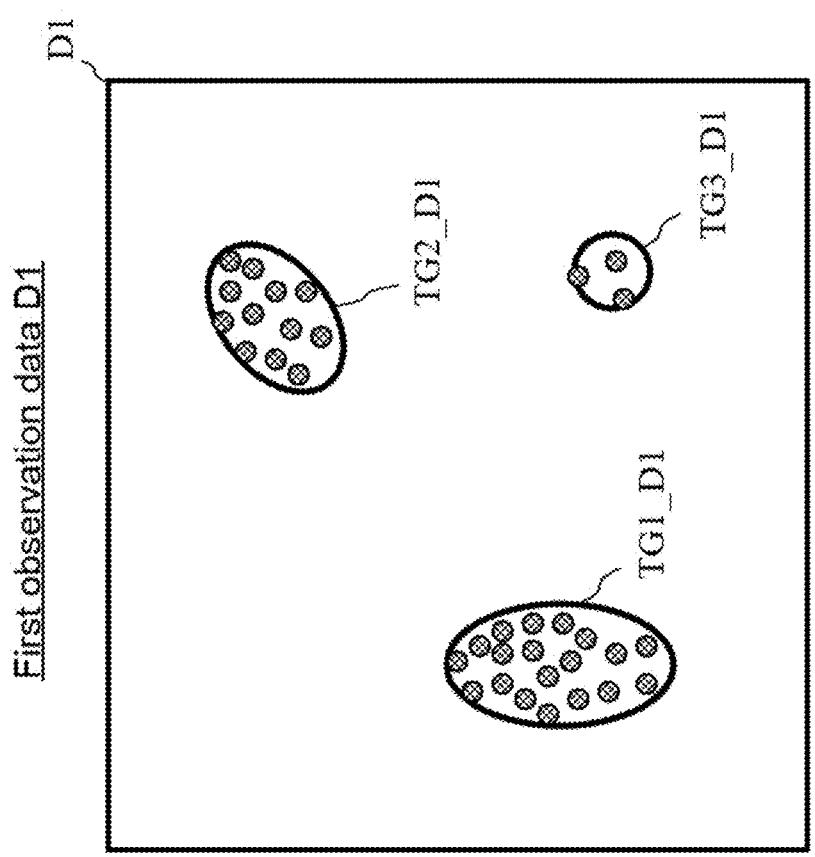
FIG. 3 is a schematic diagram showing first observation data D1 obtained by a first observation obtaining unit 1.

FIG. 3 is a schematic diagram showing the first observation data D1 obtained by the first observation obtaining unit 1. FIG. 3 is a schematic diagram showing particles (one example) used for detecting (tracking) an object.

Figure 4:
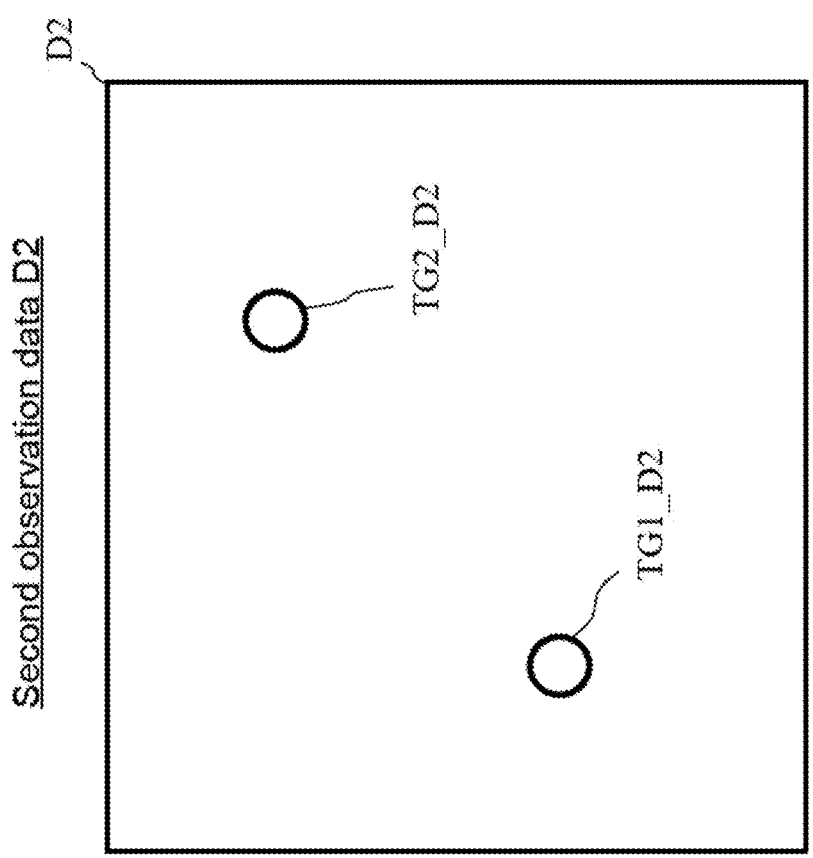
FIG. 4 is a schematic diagram showing second observation data D2 obtained by a second observation obtaining unit 2.

FIG. 4 is a schematic diagram showing the second observation data D2 obtained by the second observation obtaining unit 2.

At the current time (time t), the input data Din shown in FIG. 2 is input into the first observation obtaining unit 1 and the second observation obtaining unit 2.

As shown in FIG. 2, the input data Din at time t includes four objects TG1 to TG4. The objects TG1, TG2, and TG3 are persons, whereas the object TG4 is an object other than a person. The objects TG1 and TG2 are moving objects. More specifically, the objects TG1 and TG2 at the current time t (the time step of the current frame) have moved from the positions at the preceding time t−1 (the time step preceding time t by one frame) by at least a predetermined distance in the image.

The first observation obtaining unit 1 obtains the first observation data D1 by extracting image areas corresponding to persons from the input data Din. For example, the first observation obtaining unit 1 detects an image area corresponding to a person in the image formed using the input data Din by detecting an area containing much skin color component and/or by pattern matching for the shape of a person in the input data Din. The first observation obtaining unit 1 obtains the detected resultant image as the first observation data D1. In this manner, the first observation obtaining unit 1 obtains the first observation data D1 shown in FIG. 3. In FIG. 3, the areas detected from the first observation data D1 are image areas TG1_D1, TG2_D1, and TG3_D1 respectively corresponding to the objects TG1, TG2, and TG3, which are persons included in the input data Din. In the first observation data D1 (image D1) shown in FIG. 3, the pixels included in the image areas TG1_D1, TG2_D1, and TG3_D1 have pixel values other than 0, whereas the pixels included in image areas other than the image areas TG1_D1, TG2_D1, TG3_D1 have pixel values of 0.

The first observation data D1 obtained by the first observation obtaining unit 1 is output from the first observation obtaining unit 1 to the first likelihood obtaining unit 3.

The second observation obtaining unit 2 obtains the second observation data D2 by extracting image areas corresponding to moving objects from the input data Din. For example, the second observation obtaining unit 2 detects an image area corresponding to a moving object in the image formed using the input data Din by detecting the image area of an object that has moved in the image formed using the input data Din by at least a predetermined distance within one frame period (from the preceding time t−1 to the current time t). The second observation obtaining unit 2 obtains the detected resultant image as the second observation data D2. In this manner, the second observation obtaining unit 2 obtains the second observation data D2 shown in FIG. 4. FIG. 4 shows image areas TG1_D2 and TG2_D2 detected by the second observation obtaining unit 2, which detects the image areas of the objects that have moved in the image formed using the input data Din by at least a predetermined distance within one frame period (from the preceding time t−1 to the current time t) as circular areas having a predetermined radius and centered on the gravity center of the corresponding objects at time t. In FIG. 4, the areas detected from the second observation data D2 are image areas TG1_D2 and TG2_D2, which respectively correspond to the moving objects TG1 and TG2 in the input data Din. In the second observation data D2 (image D2) shown in FIG. 4, the pixels included in the image areas TG1_D2 and TG2_D2 have pixel values other than 0, whereas the pixels included in the image areas other than the image areas TG1_D2 and TG2_D2 have pixel values of 0.

The second observation data D2 obtained by the second observation obtaining unit 2 is output from the second observation obtaining unit 2 to the second likelihood obtaining unit 4.

The state vector $x_t$ represents the internal state of an object as an observation target (tracking target) at time t. The observation vector $y_t$ represents the feature observed at time t. The set of samples (the set of particles) $S_{t|t-1}$ generated in accordance with the predictive probability distribution $p(x_t|y_{t-1})$ is written as $$S_{t|t-1} = \{s_{t|t-1}^{(1)}, s_{t|t-1}^{(2)}, \ldots, s_{t|t-1}^{(M)}\}.$$

The set of samples (the set of particles) $S_{t|t}$ generated in accordance with the posterior probability distribution $p(x_t|y_t)$ is written as $$S_{t|t} = \{s_{t|t}^{(1)}, s_{t|t}^{(2)}, \ldots, s_{t|t}^{(M)}\}.$$

The i-th sample (particle) $s_{t|t}^{(i)}$ in the set of samples (the set of particles) $S_{t|t}$ is vector data having, as its internal variables, the coordinate position $(X_t^{(i)}, Y_t^{(i)})$ of the i-th sample (particle) in the image, and the width $W_t$ and the height $H_t$ of the rectangular image area centered on the coordinate position. More specifically, the sample (particle) $s_{t|t}^{(i)}$ is written as $$s_{t|t}^{(i)} = (X_t^{(i)}, Y_t^{(i)}, W_t^{(i)}, H_t^{(i)}).$$

For multiple observation targets (tracking targets), each observation target is given an object number, and the set of samples (the set of particles) $S_{t|t-1}$ generated in accordance with the predictive probability distribution and the set of samples (the set of particles) $S_{t|t}$ generated in accordance with the posterior probability distribution are set for each observation target in the same manner as described above.

For ease of explanation, the observation target (tracking target) is the object TG1 in the example described below.

The prior probability distribution prediction unit 7 performs prediction.

In detail, the prior probability distribution prediction unit 7 performs prediction using the posterior probability distribution data at time t−1 obtained by the posterior probability distribution obtaining unit 6 as the prior probability distribution data at time t. More specifically, the prior probability distribution prediction unit 7 performs prediction based on the set of particles $S_{t-1|t-1}$ generated in accordance with the prior probability distribution (prior probability distribution data) to obtain the set of particles $S_{t|t-1}$ resulting from the prediction (predictive probability distribution data).

In one example, Gaussian noise using the dynamics of random walks as the underlying assumption is added to the state of each particle included in the set of particles (this is referred to as the prior probability distribution data $S_{t-1|t-1}$) generated in accordance with the prior probability distribution (prior probability distribution data) for the parameters indicating the state of the object TG1 at time t−1. This prediction generates the set of particles $S_{t|t-1}$ (this is referred to as the predictive probability distribution data $S_{t|t-1}$). More specifically, the prior probability distribution prediction unit 7 obtains the set of particles $S_{t|t-1}$ resulting from the prediction by the formula below.

$$s_{t|t-1}^{(i)} = f(s_{t-1|t-1}^{(i)}, v_t^{(i)})$$

where $v_t^{(i)}$ is system noise in accordance with the Gaussian distribution, f( ) is a state transition function indicating a change in states between time t−1 and time t, and $v_t^{(i)}$ is system noise.

In more detail, the internal state of the i-th particle generated in accordance with the prior probability distribution (prior probability distribution data) for the object TG1 at time t−1 is $(X_{t-1|t-1}^{(i)}, Y_{t-1|t-1}^{(i)}, W_{t-1|t-1}^{(i)}, H_{t-1|t-1}^{(i)}, wc_{t-1|t-1}^{(i)})$, and the internal state of the i-th particle resulting from the prediction is $(X_{t|t-1}^{(i)}, Y_{t|t-1}^{(i)}, W_{t|t-1}^{(i)}, H_{t|t-1}^{(i)}, wc_{t|t-1}^{(i)})$. Thus, the prior probability distribution prediction unit 7 obtains the set of particles $S_{t|t-1}$ for the object TG1 resulting from the prediction as $$X_{t|t-1}^{(i)} = X_{t-1|t-1}^{(i)} + \Delta X^{(i)},$$

$$Y_{t|t-1}^{(i)} = Y_{t-1|t-1}^{(i)} + \Delta Y^{(i)},$$

$$W_{t|t-1}^{(i)} = W_{t-1|t-1}^{(i)} + \Delta W^{(i)}, \text{ and}$$

$$H_{t|t-1}^{(i)} = H_{t-1|t-1}^{(i)} + \Delta H^{(i)},$$

where $\Delta X^{(i)}$, $\Delta Y^{(i)}$, $\Delta W^{(i)}$, and $\Delta H^{(i)}$ are in accordance with the Gaussian distribution.

The set of particles $S_{t|t-1}$ for the object TG1 resulting from the prediction is then output from the prior probability distribution prediction unit 7 to the first likelihood obtaining unit 3, the second likelihood obtaining unit 4, and the posterior probability distribution obtaining unit 6 as the predictive probability distribution data.

In the initial state, the prior probability distribution prediction unit 7 generates the prior probability distribution data based on the initially set data output from the initial state setting unit 8, and outputs the generated prior probability distribution data to the first likelihood obtaining unit 3, the second likelihood obtaining unit 4, and the posterior probability distribution obtaining unit 6 as the predictive probability distribution data.

The first likelihood obtaining unit 3 obtains the first likelihood w1 based on the predictive probability distribution data obtained by the prior probability distribution prediction unit 7 and the first observation data D1.

Figure 5:
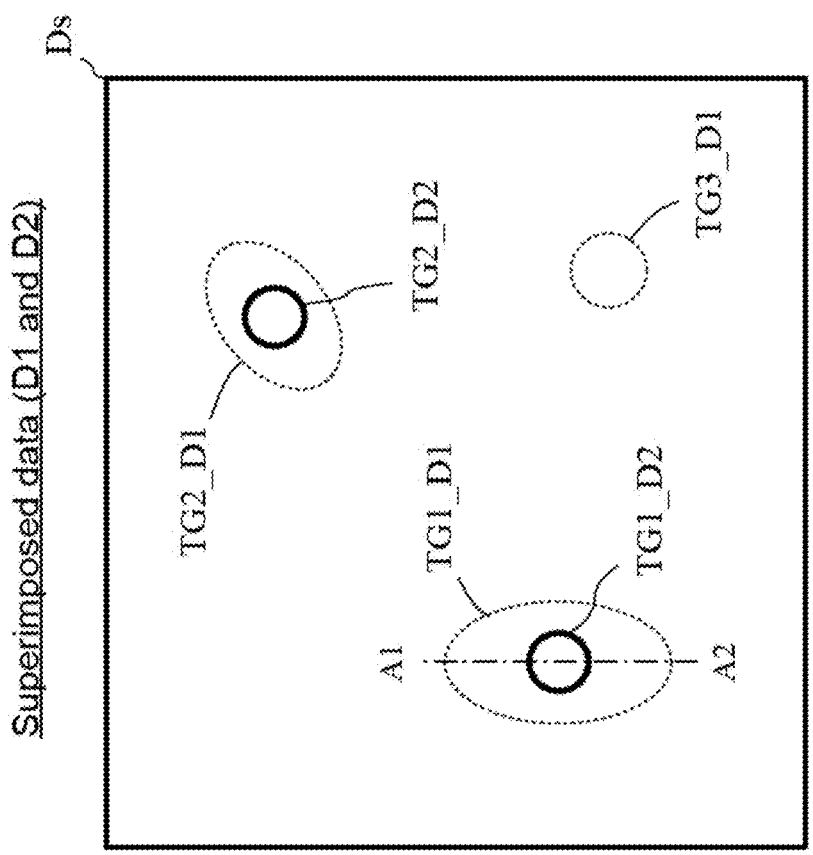
FIG. 5 is a schematic diagram showing the first observation data D1 (image data D1 corresponding to first observation data) and the second observation data D2 (image data D2 corresponding to second observation data) that are superimposed on each other.

FIG. 5 is a schematic diagram showing the first observation data D1 (image data D1 corresponding to first observation data) and the second observation data D2 (image data D2 corresponding to second observation data) that are superimposed on each other.

Figure 6:
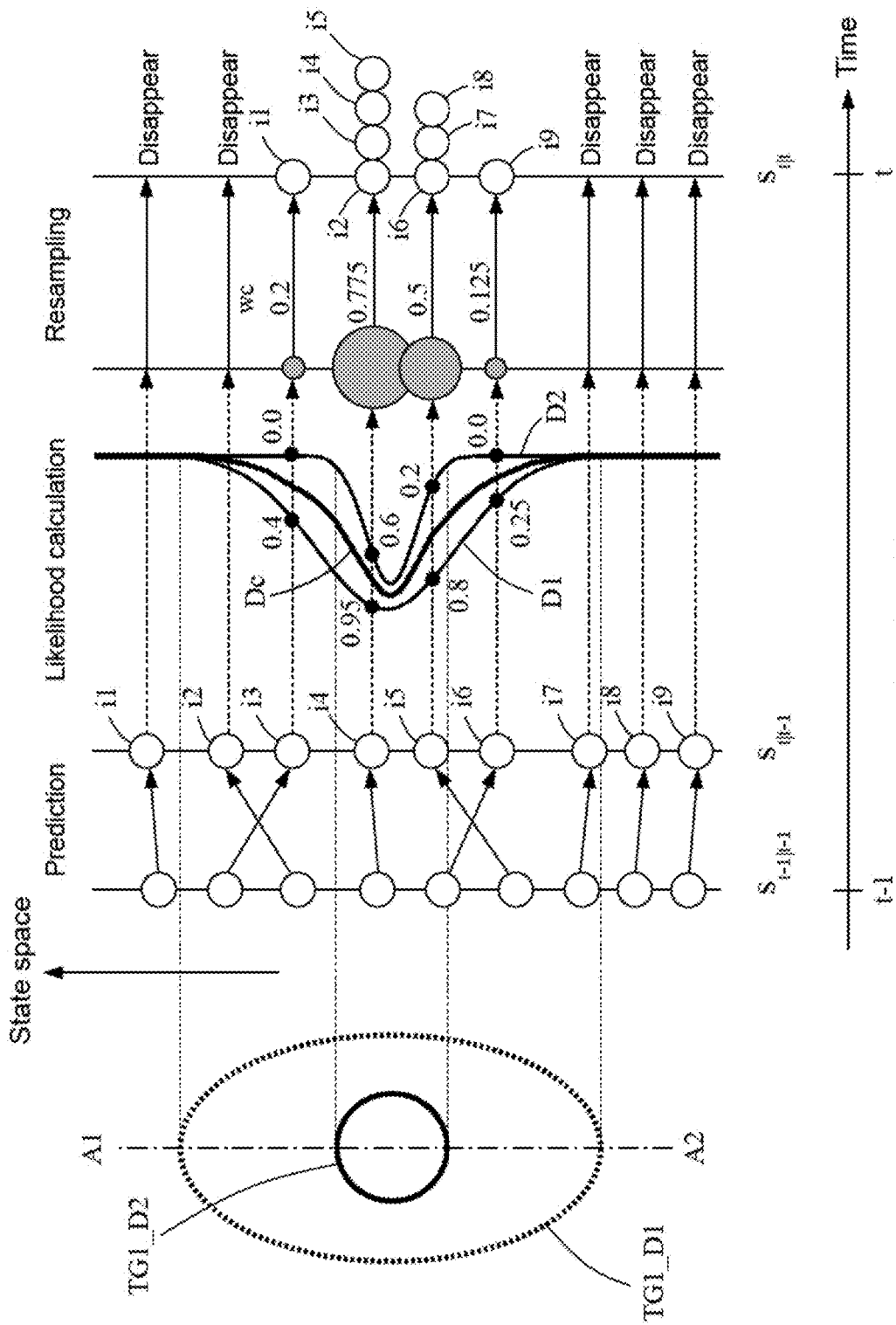
FIG. 6 is a diagram describing a predicting process, a likelihood obtaining (likelihood calculation) process, and a resampling process for an object TG1 as an observation target (tracking target).

FIG. 6 is a diagram describing a predicting process, a likelihood obtaining (likelihood calculation) process, and a resampling process for the object TG1 as an observation target (tracking target). FIG. 6 is a schematic diagram showing particles in the vertical direction (Y-direction). In more detail, FIG. 6 is a schematic diagram showing particles arranged on straight line A1-A2 in the vertical direction in FIG. 5. FIG. 6 also shows curve D1 indicating the values of the first observation data D1 (the pixel values of the image D1) along straight line A1-A2 and curve D2 indicating the values of the second observation data D2 (the pixel values of the image D2) along straight line A1-A2. In FIG. 6, the curves D1 and D2 indicate larger pixel values (values in the positive direction) toward the left.

The first likelihood obtaining unit 3 calculates the first likelihood w1 using the predictive probability distribution data $S_{t|t-1}$ output from the prior probability distribution prediction unit 7, and the first observation data D1 (image D1).

As shown in FIG. 6, the prior probability distribution prediction unit 7 performs prediction using the set of particles $S_{t-1|t-1}$ generated in accordance with the prior probability distribution at time t (the posterior probability distribution of time t−1) to obtain the predictive probability distribution data $S_{t|t-1}$.

The first likelihood obtaining unit 3 integrates the values of the first observation data D1 (image D1) included in the image area occupied by each particle obtained in accordance with the predictive probability distribution data $S_{t|t-1}$ (the pixel values of pixels included in the image area occupied by each particle in the image D1), and uses the integrated value as the first likelihood w1. The first likelihood w1 obtained in this manner is indicated by each dot in FIG. 6. A larger dot indicates a greater first likelihood w1.

In the image D1, the i-th particle resulting from the prediction has an internal state of $(X_{t|t-1}^{(i)}, Y_{t|t-1}^{(i)}, W_{t|t-1}^{(i)}, H_{t|t-1}^{(i)}, wc_{t|t-1}^{(i)})$, and thus the image area occupied by this particle is a rectangular area centered on the coordinates $(X_{t|t-1}^{(i)}, Y_{t|t-1}^{(i)})$ and having the width (the length in the horizontal direction) $W_{t|t-1}^{(i)}$ and the height (the length in the vertical direction) $H_{t|t-1}^{(i)}$.

The values of the first observation data D1 (image D1) in FIG. 6 are normalized data (values) ranging from 0 to 1.

In FIG. 6, particle numbers i1 to i9 are assigned to the particles obtained in accordance with the predictive probability distribution data $S_{t|t-1}$. When $w1^{(i)}$ is the first likelihood value of the i-th particle, the first likelihood values $w1^{(i1)}$, $w1^{(i2)}$, $w1^{(i7)}$, $w1^{(i8)}$ and $w1^{(i9)}$ are 0

The first likelihood values of the i3-rd to i6-th particles are as follows:

$w1^{(i3)} = 0.4$
$w1^{(i4)} = 0.95$
$w1^{(i5)} = 0.8$
$w1^{(i6)} = 0.25$

The first likelihood obtained as described above (data including the first likelihood value of each particle) is output from the first likelihood obtaining unit 3 to the likelihood combining unit 5.

The second likelihood obtaining unit 4 calculates the second likelihood w2 using the predictive probability distribution data $S_{t|t-1}$ output from the prior probability distribution prediction unit 7, and the second observation data D2 (image D2).

As shown in FIG. 6, the prior probability distribution prediction unit 7 performs prediction using the set of particles $S_{t-1|t-1}$ generated in accordance with the prior probability distribution at time t (the posterior probability distribution of time t−1) to obtain the predictive probability distribution data $S_{t|t-1}$.

The second likelihood obtaining unit 4 integrates the values of the second observation data D2 (image D2) included in the image area occupied by each particle obtained in accordance with the predictive probability distribution data (the pixel values of pixels included in the image area occupied by each particle in the image D2), and uses the integrated value as the second likelihood w2.

In the image D2, the i-th particle resulting from the prediction has an internal state of $(X_{t|t-1}^{(i)}, Y_{t|t-1}^{(i)}, W_{t|t-1}^{(i)}, H_{t|t-1}^{(i)}, wc_{t|t-1}^{(i)})$, and thus the image area occupied by this particle is a rectangular area centered on the coordinates $(X_{t|t-1}^{(i)}, Y_{t|t-1}^{(i)})$ and having the width (the length in the horizontal direction) $W_{t|t-1}^{(i)}$ and the height (the length in the vertical direction) $H_{t|t-1}^{(i)}$.

The values of the second observation data D2 (image D2) in FIG. 6 are normalized data (values) ranging from 0 to 1.

As shown in FIG. 6, particle numbers i1 to i9 are assigned to the particles obtained in accordance with the predictive probability distribution data $S_{t|t-1}$. When $w2^{(i)}$ is the second likelihood value of the i-th particle, the second likelihood values $w2^{(i1)}$, $w2^{(i2)}$, $w2^{(i3)}$, $w2^{(i6)}$, $w2^{(i7)}$, $w2^{(i8)}$, and $w2^{(i9)}$ are 0.

The second likelihood values of the i4-th to i5-th particles are as follows:

$w2^{(i4)}$=0.6

$w2^{(i5)}$=0.2

The second likelihood obtained as described above (data including the second likelihood value of each particle) is output from the second likelihood obtaining unit 4 to the likelihood combining unit 5.

The likelihood combining unit 5 combines the first likelihood w1 with the second likelihood w2 based on the reliability data P(1) indicating the reliability of the observation data obtained by the first observation obtaining unit 1 and the reliability data P(2) indicating the reliability of the observation data obtained by the second observation obtaining unit 2 to obtain a combined likelihood wc.

For ease of explanation, the reliability data P(1) for the first observation data and the reliability data P(2) for the second observation data both have the value of 1. In other words, the reliability of the observation data obtained by the first observation obtaining unit 1 is assumed to be the same as the reliability of the observation data obtained by the second observation obtaining unit 2.

For each particle obtained in accordance with the predictive probability distribution data $S_{t|t-1}$, the likelihood combining unit 5 combines the first likelihood w1 with the second likelihood w2 to obtain a combined likelihood wc. In more detail, when $wc^{(i)}$ is the combined likelihood value of the i-th particle, the likelihood combining unit 5 obtains the combined likelihood value $wc^{(i)}$ of the i-th particle with the formula below.

$$wc^{(i)}=P(1)/\{P(1)+P(2)\} \times w1^{(i)}+P(2)/\{P(1)+P(2)\} \times w2^{(i)}$$

In FIG. 6, the curve Dc is plotted using the combined likelihood wc obtained as described above.

In the example shown in FIG. 6, the likelihood combining unit 5 obtains the combined likelihood value $wc^{(i)}$ of the i-th particle with the formulas below.

$$wc^{(i1)} = wc^{(i2)} = wc^{(i7)} = wc^{(i8)} = wc^{(i9)} = 0$$

$$\begin{aligned} wc^{(i3)} &= 0.5 \times w1^{(i3)} + 0.5 \times w2^{(i3)} \\ &= 0.5 \times 0.4 + 0.5 \times 0.0 \\ &= 0.2 \end{aligned}$$

$$\begin{aligned} wc^{(i4)} &= 0.5 \times w1^{(i4)} + 0.5 \times w2^{(i4)} \\ &= 0.5 \times 0.95 + 0.5 \times 0.6 \\ &= 0.775 \end{aligned}$$

$$\begin{aligned} wc^{(i5)} &= 0.5 \times w1^{(i5)} + 0.5 \times w2^{(i5)} \\ &= 0.5 \times 0.8 + 0.5 \times 0.2 \\ &= 0.5 \end{aligned}$$

$$\begin{aligned} wc^{(i6)} &= 0.5 \times w1^{(i5)} + 0.5 \times w2^{(i5)} \\ &= 0.5 \times 0.25 + 0.5 \times 0.0 \\ &= 0.125 \end{aligned}$$

The combined likelihood obtained as described above (data including the combined likelihood value of each particle) is output from the likelihood combining unit 5 to the posterior probability distribution obtaining unit 6.

The posterior probability distribution obtaining unit 6 obtains (estimates) the posterior probability distribution (posterior probability distribution data) based on the combined likelihood wc and the predictive probability distribution data.

The posterior probability distribution obtaining unit 6 samples M1 particles without changing the total number of the particles at the ratio proportional to the combined likelihood $wc^{(i)}$ of the object TG1 at time t (samples the particle $xa_t^{(i)}$, or the i-th particle of the object TG1). In the example shown in FIG. 6, nine particles are sampled on straight line A1-A2 included in the image area TG1_D1.

The i3-rd particle obtained in accordance with the predictive probability distribution data $S_{t|t-1}$ is used to obtain the combined likelihood $wc^{(i3)}$ of 0.2. Based on the proportional distribution, one particle is sampled at the position of the i3-rd particle obtained in accordance with the predictive probability distribution data $S_{t|t-1}$. More specifically, the i1-st particle obtained in accordance with the posterior probability distribution data $S_{t|t}$ is sampled.

The i4-th particle obtained in accordance with the predictive probability distribution data $S_{t|t-1}$ is used to obtain the combined likelihood $wc^{(i4)}$ of 0.775. Based on the proportional distribution, four particles are sampled at the position of the i4-th particle obtained in accordance with the predictive probability distribution data $S_{t|t-1}$. More specifically, the i2-nd to i5-th particles, or four particles in total obtained in accordance with the posterior probability distribution data $S_{t|t}$, are sampled.

The i5-th particle obtained in accordance with the predictive probability distribution data $S_{t|t-1}$ is used to obtain the combined likelihood $wc^{(i5)}$ of 0.5. Based on the proportional distribution, three particles are sampled at the position of the i5-th particle obtained in accordance with the predictive probability distribution data $S_{t|t-1}$. More specifically, the i6-th to i8-th particles, or three particles in total obtained in accordance with the posterior probability distribution data $S_{t|t}$, are sampled.

The i6-th particle obtained in accordance with the predictive probability distribution data $S_{t|t-1}$ is used to obtain the combined likelihood $wc^{(i6)}$ of 0.125. Based on the proportional distribution, one particle is sampled at the position of the i6-th particle obtained in accordance with the predictive probability distribution data $S_{t|t-1}$. More specifically, the i9-th particle obtained in accordance with the posterior probability distribution data $S_{t|t}$ is sampled.

As described above, the posterior probability distribution obtaining unit 6 samples M1 particles without changing the total number of the particles at the ratio proportional to the combined likelihood $wc^{(i)}$ of the object TG1 at time t (samples the particle $xa_t^{(i)}$, or the i-th particle of the object TG1).

The posterior probability distribution obtaining unit 6 obtains a set of samples (a set of particles) $S_{t|t}$ (posterior probability distribution data $S_{t|t}$) in accordance with the posterior probability distribution $p(x_t|y_t)$ at time t from the distribution of the sampled M1 particles written as $$S_{t|t} = \{s_{t|t}^{(1)}, s_{t|t}^{(2)}, \ldots s_{t|t}^{(M1)}\}.$$

The posterior probability distribution obtaining unit 6 outputs the estimated (obtained) posterior probability distribution (posterior probability distribution data) from the state estimation apparatus 1000. The posterior probability distribution obtaining unit 6 also outputs the distribution data to the prior probability distribution prediction unit 7.

The prior probability distribution prediction unit 7 performs prediction in the same manner as described above using the posterior probability distribution (posterior probability distribution data) at time t input from the posterior probability distribution obtaining unit 6 as the prior probability distribution data at the next time t+1.

Subsequently, the state estimation apparatus 1000 repeats the processing described above.

As described above, the state estimation apparatus 1000 obtains a plurality of sets of observation data, and obtains a combined likelihood wc using a plurality of likelihoods calculated respectively from the plurality of sets of observation data and the reliability of each of the obtained sets of observation data. The state estimation apparatus 1000 obtains the posterior probability distribution (posterior probability distribution data) $S_{t|t}$ reflecting the obtained combined likelihood wc.

The state estimation apparatus 1000 obtains a plurality of sets of observation data (the first observation data D1 and the second observation data D2), and combines a plurality of likelihoods calculated respectively from the obtained plurality of sets of observation data (the first likelihood w1 and the second likelihood w2) based on the reliability of each set of observation data (the reliability data P(1) indicating the reliability of the observation data obtained by the first observation obtaining unit 1 and the reliability data P(2) indicating the reliability of the observation data obtained by the second observation obtaining unit 2) to obtain a combined likelihood wc. More specifically, the state estimation apparatus 1000 obtains the combined likelihood wc based on observation data with higher reliability, thereby obtaining highly accurate posterior probability distribution data $S_{t|t}$. The state estimation apparatus 1000 thus enables more accurate and robust detection and tracking of an object using the highly accurate posterior probability distribution data $S_{t|t}$.

The reliability data P(1) and the reliability data P(2) may be set to fixed values based on, for example, the accuracy of the sensor for obtaining observation data when the accuracy of the sensor is known in advance.

The reliability data P(1) and the reliability data P(2) may be binary data (e.g., data with a value of 0 or 1), or may be continuous values between 0 and 1.

First Modification

A first modification of the first embodiment will now be described.

In this modification, the components that are the same as in the first embodiment are given the same reference numerals as those components, and will not be described in detail.

Figure 7:
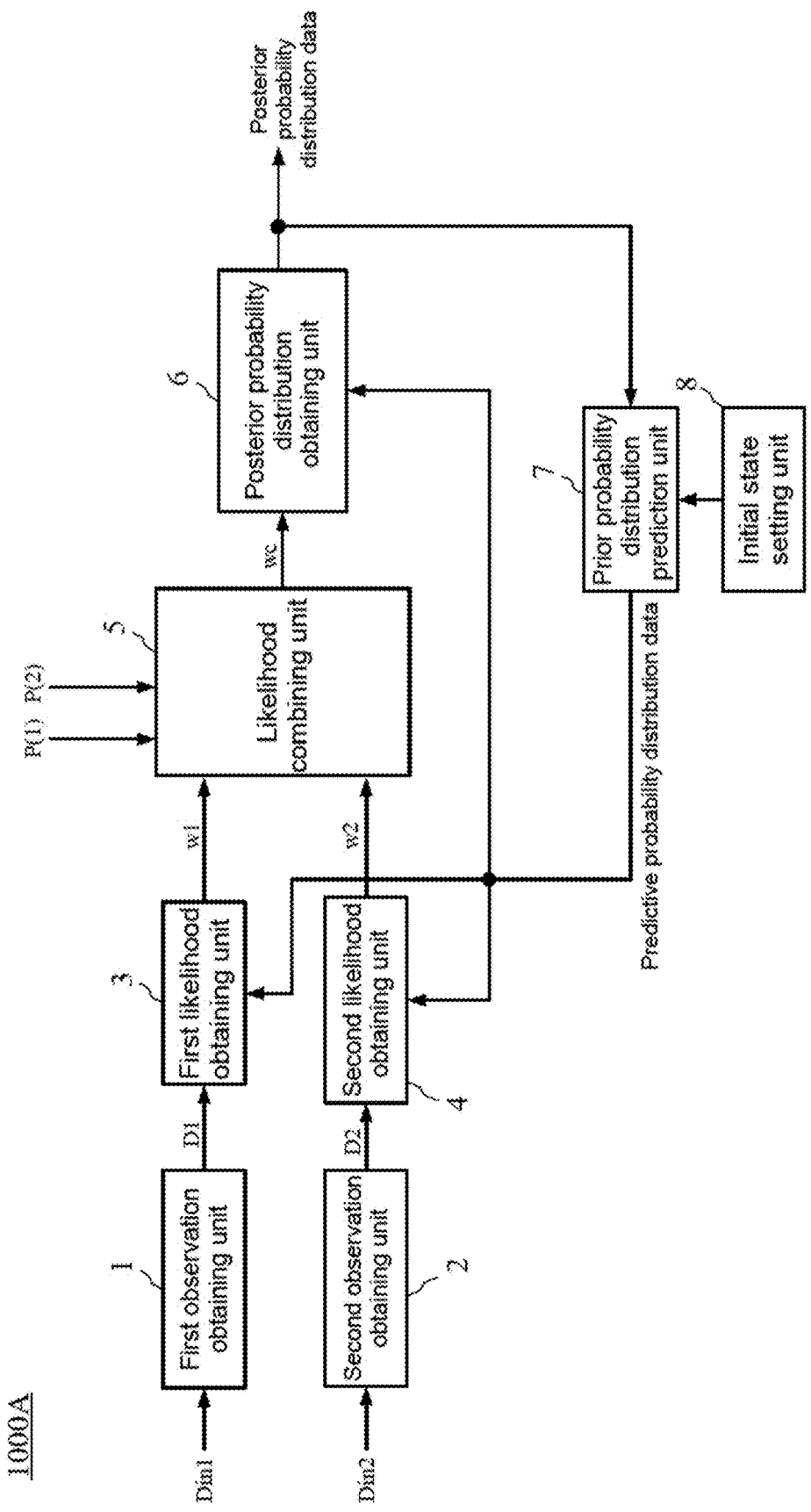
FIG. 7 is a schematic block diagram of a state estimation apparatus 1000A according to a first modification of the first embodiment.

FIG. 7 is a schematic block diagram of a state estimation apparatus 1000A according to the first modification of the first embodiment.

In the state estimation apparatus 1000A of the first modification, the first observation obtaining unit 1 receives first input data Din1, and the second observation obtaining unit 2 receives second input data Din2. The state estimation apparatus 1000A of this modification differs from the state estimation apparatus 1000 of the first embodiment in that the first and second observation obtaining units 1 and 2 in the state estimation apparatus 1000A receive different data sets, whereas the first and second observation obtaining units 1 and 2 in the state estimation apparatus 1000 receive the same input data Din.

In the state estimation apparatus 1000A of this modification in which the first observation obtaining unit 1 and the second observation obtaining unit 2 can receive different data sets, for example, the first observation obtaining unit 1 may receive a signal (data) Din1 obtained by a first sensor (e.g., a visible light image sensor) (not shown), and the second observation obtaining unit 2 may receive a signal (data) Din2 obtained by a second sensor (e.g., an infrared image sensor) (not shown).

The state estimation apparatus 1000A of this modification obtains a plurality of sets of observation data, and obtains a combined likelihood wc using a plurality of likelihoods calculated respectively from the plurality of sets of observation data and the reliability of each of the plurality of sets of observation data. The state estimation apparatus 1000A can obtain the posterior probability distribution (posterior probability distribution data) $S_{t|t}$ reflecting the obtained combined likelihood wc.

The state estimation apparatus 1000A obtains a plurality of sets of observation data (first observation data D1 and second observation data D2), and combines a plurality of likelihoods calculated respectively from the obtained plurality of sets of observation data (first likelihood w1 and second likelihood w2) based on the observation data reliability (the reliability data P(1) indicating the reliability of the observation data obtained by the first observation obtaining unit 1 and the reliability data P(2) indicating the reliability of the observation data obtained by the second observation obtaining unit 2) to obtain a combined likelihood wc. More specifically, the state estimation apparatus 1000A obtains the combined likelihood wc based on the observation data with higher reliability, thereby obtaining highly accurate posterior probability distribution data $S_{t|t}$. The state estimation apparatus 1000A thus enables more accurate and robust detection and tracking of an object using the highly accurate posterior probability distribution data $S_{t|t}$.

Second Embodiment

A second embodiment will now be described.

In the present embodiment, the components that are the same as in the above embodiment and modification are given the same reference numerals as those components, and will not be described in detail.

2.1 Structure of State Estimation Apparatus

Figure 8:
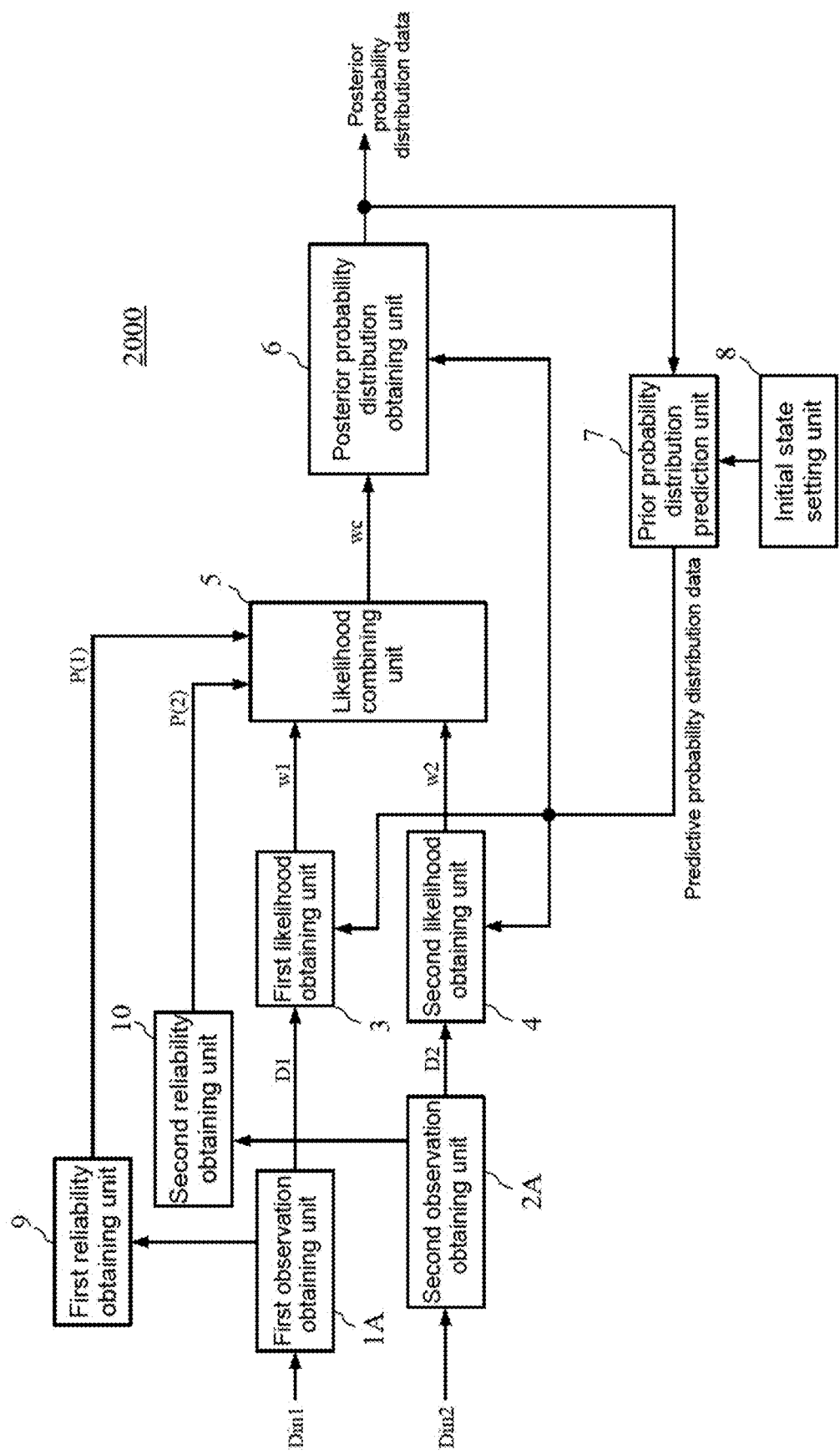
FIG. 8 is a schematic block diagram of a state estimation apparatus 2000 according to a second embodiment.

FIG. 8 is a schematic block diagram of a state estimation apparatus 2000 according to the second embodiment.

As shown in FIG. 8, the state estimation apparatus 2000 of the second embodiment differs from the state estimation apparatus 1000A according to the first modification of the first embodiment in that the first observation obtaining unit 1 and the second observation obtaining unit 2 are replaced with a first observation obtaining unit 1A and a second observation obtaining unit 2A, and the state estimation apparatus 2000 additionally includes a first reliability obtaining unit 9 and a second reliability obtaining unit 10.

The first observation obtaining unit 1A obtains data about the detection accuracy of the first observation data D1 (first detection accuracy data), and outputs the obtained first detection accuracy data to the first reliability obtaining unit 9.

The second observation obtaining unit 2A obtains data about the detection accuracy of the second observation data D2 (second detection accuracy data), and outputs the obtained second detection accuracy data to the second reliability obtaining unit 10.

The first reliability obtaining unit 9 receives the first detection accuracy data output from the first observation obtaining unit 1A. Based on the first detection accuracy data, the first reliability obtaining unit 9 obtains reliability data P(1) indicating the reliability of the observation data obtained by the first observation obtaining unit 1, and outputs the obtained reliability data P(1) to the likelihood combining unit 5.

The second reliability obtaining unit 10 receives the second detection accuracy data output from the second observation obtaining unit 2A. Based on the second detection accuracy data, the second reliability obtaining unit 10 obtains reliability data P(2) indicating the reliability of the observation data obtained by the second observation obtaining unit 2, and outputs the obtained reliability data P(2) to the likelihood combining unit 5.

2.2 Operation of State Estimation Apparatus

The operation of the state estimation apparatus 2000 with the above-described structure will now be described.

In the example described below, the first observation obtaining unit 1A in the state estimation apparatus 2000 receives a signal (data) Din1 obtained by an imaging apparatus including a visible light image sensor, whereas the second observation obtaining unit 2A receives a signal (data) Din2 obtained by an imaging apparatus including an infrared image sensor.

The components that are the same as in the first embodiment will not be described in detail.

Figure 9:
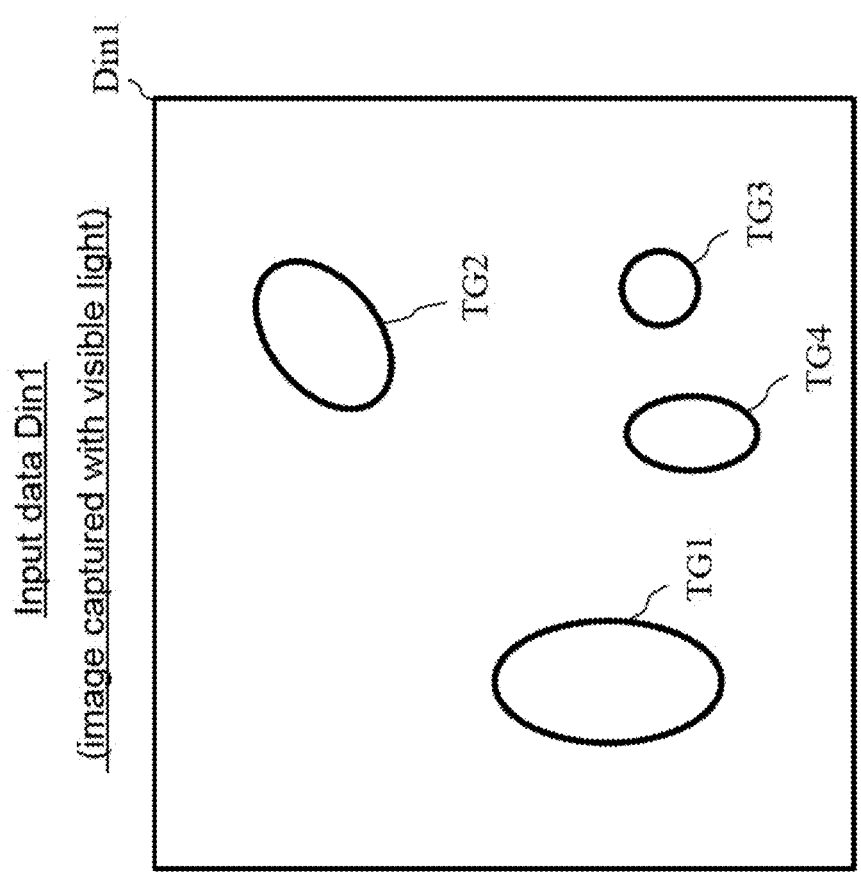
FIG. 9 is a schematic diagram showing input data Din1, which is a moving image captured by an imaging apparatus (not shown) including a visible light image sensor (captured moving image).

FIG. 9 is a schematic diagram showing the input data Din1, which is a moving image captured by the imaging apparatus (not shown) including the visible light image sensor (captured moving image).

Figure 10:
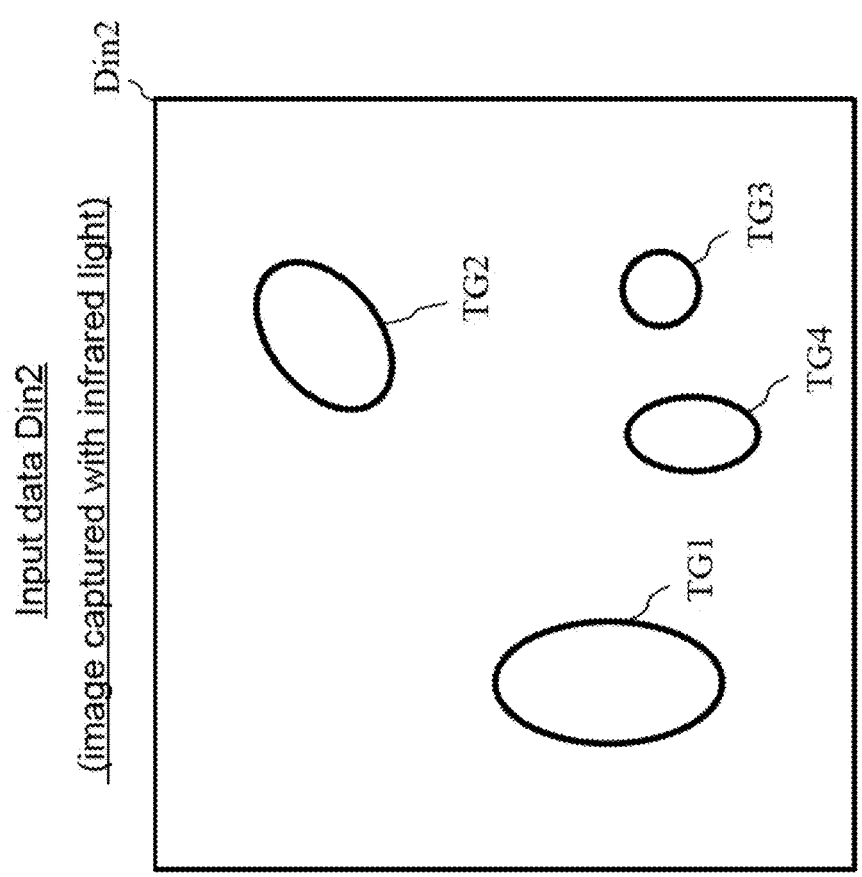
FIG. 10 is a schematic diagram showing input data Din2, which is a moving image captured by an imaging apparatus (not shown) including an infrared image sensor (captured moving image).

FIG. 10 is a schematic diagram showing the input data Din2, which is a moving image captured by the imaging apparatus (not shown) including the infrared image sensor (captured moving image).

Figure 11:
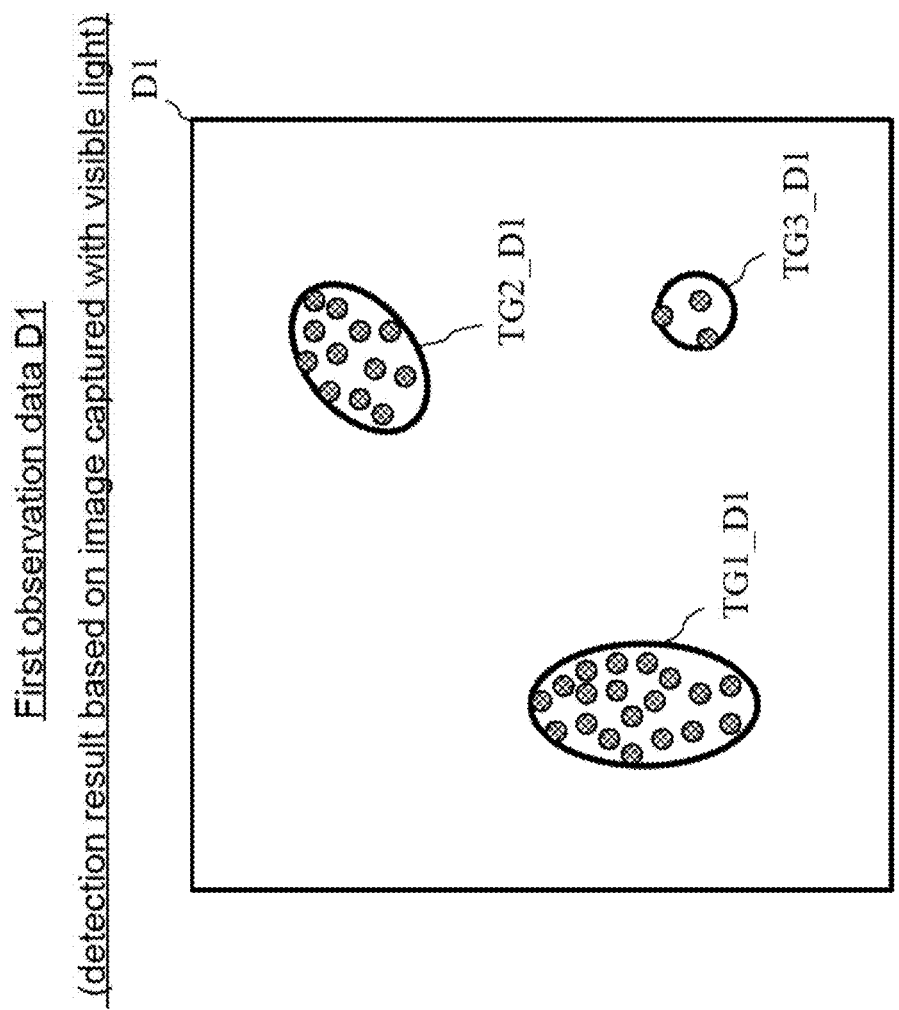
FIG. 11 is a schematic diagram showing first observation data D1 obtained by a first observation obtaining unit 1A.

FIG. 11 is a schematic diagram showing the first observation data D1 obtained by the first observation obtaining unit 1A. FIG. 11 is a schematic diagram also showing particles (one example) used for detecting (tracking) an object.

Figure 12:
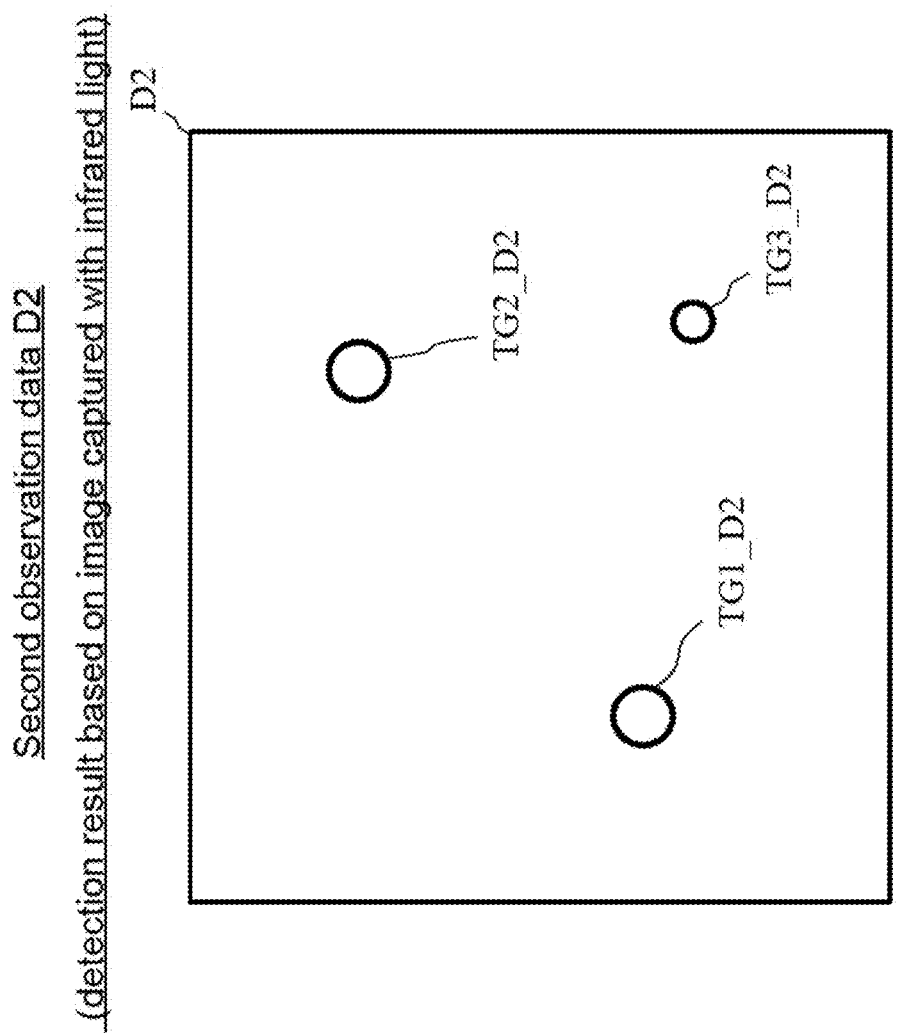
FIG. 12 is a schematic diagram showing second observation data D2 obtained by a second observation obtaining unit 2A.

FIG. 12 is a schematic diagram showing the second observation data D2 obtained by the second observation obtaining unit 2A.

The first observation obtaining unit 1A receives the input data Din1, which is a moving image obtained by the imaging apparatus including the visible light image sensor (captured moving image).

The first observation obtaining unit 1A obtains the first observation data D1 by extracting image areas corresponding to persons from the input data Din1. For example, the first observation obtaining unit 1A detects an image area corresponding to a person in the image formed using the input data Dint by detecting an area containing much skin color component and/or by pattern matching for the shape of a person in the input data Din1. The first observation obtaining unit 1A obtains the detected resultant image as the first observation data D1. In this manner, the first observation obtaining unit 1A obtains the first observation data D1 shown in FIG. 11. In FIG. 11, the areas detected from the first observation data D1 are image areas TG1_D1, TG2_D1, and TG3_D1, respectively corresponding to the objects TG1, TG2, and TG3, which are persons included in the input data Din1. In the first observation data D1 (image D1) shown in FIG. 11, the pixels included in the image areas TG1_D1, TG2_D1, and TG3_D1 have pixel values other than 0, whereas the pixels included in the image areas other than the image areas TG1_D1, TG2_D1, and TG3_D1 have pixel values of 0.

The first observation data D1 obtained by the first observation obtaining unit 1A is output from the first observation obtaining unit 1 to the first likelihood obtaining unit 3.

The second observation obtaining unit 2A receives the input data Din2, which is a moving image obtained by the imaging apparatus including the infrared image sensor (captured moving image).

The second observation obtaining unit 2A obtains the second observation data D2 by extracting image areas corresponding to persons from the input data Din2. For example, the second observation obtaining unit 2A detects an image area corresponding to a person in the image formed using the input data Din2 by detecting an area corresponding to an object emitting a great amount of infrared light and/or by pattern matching for the shape of a person in the input data Din2. The second observation obtaining unit 2A obtains the detected resultant image as the second observation data D2. In this manner, the second observation obtaining unit 2A obtains the second observation data D2 shown in FIG. 12. In FIG. 12, the areas detected from the second observation data D2 are image areas TG1_D2, TG2_D2, and TG3_D2, respectively corresponding to the objects TG1, TG2, and TG3, which are persons included in the input data Din2. In the second observation data D2 (image D2) shown in FIG. 12, the pixels included in the image areas TG1_D2, TG2_D2, and TG3_D2 have pixel values other than 0, whereas the pixels included in the image areas other than the image areas TG1_D2, TG2_D2, and TG3_D2 have pixel values of 0.

The second observation data D2 obtained by the second observation obtaining unit 2A is output from the second observation obtaining unit 2 to the second likelihood obtaining unit 4.

The first observation obtaining unit 1A obtains data about the detection accuracy of first observation data D1 (first detection accuracy data). The obtained first detection accuracy data is output from the first observation obtaining unit 1A to the first reliability obtaining unit 9.

The second observation obtaining unit 2A obtains data about the detection accuracy of the second observation data D2 (second detection accuracy data). The obtained second detection accuracy data is output from the second observation obtaining unit 2A to the second reliability obtaining unit 10.

Based on the first detection accuracy data output from the first observation obtaining unit 1A, the first reliability obtaining unit 9 obtains reliability data P(1) indicating the reliability of the observation data obtained by the first observation obtaining unit 1. The obtained reliability data P(1) is output from the first reliability obtaining unit 9 to the likelihood combining unit 5.

Based on the second detection accuracy data output from the second observation obtaining unit 2A, the second reliability obtaining unit 10 obtains reliability data P(2) indicating the reliability of the observation data obtained by the second observation obtaining unit 2. The obtained reliability data P(2) is output from the second reliability obtaining unit 10 to the likelihood combining unit 5.

The processing performed by the first likelihood obtaining unit 3 and the second likelihood obtaining unit 4 is the same as the corresponding processing in the first embodiment and the first modification of the first embodiment.

The processing performed by the likelihood combining unit 5 and the posterior probability distribution obtaining unit 6 will now be described in two cases (1) where the state estimation apparatus 2000 is in a bright environment and (2) where the state estimation apparatus 2000 is in a dark environment.

2.2.1 when State Estimation Apparatus 2000 is in Bright Environment

The processing performed when the state estimation apparatus 2000 is in a bright environment will now be described.

In this case, the input data Din1, which is a moving image obtained by the imaging apparatus including the visible light image sensor (captured moving image), has high accuracy, and the input data Din2, which is a moving image obtained by the imaging apparatus including the infrared image sensor (captured moving image), also has high accuracy.

As a result, the first observation data D1 obtained by the first observation obtaining unit 1A has high accuracy. The second observation data D2 obtained by the second observation obtaining unit 2A also has high accuracy.

In this case, the first observation obtaining unit 1A outputs first detection accuracy data indicating the high detection accuracy of the first observation data to the first reliability obtaining unit 9. The second observation obtaining unit 2A also outputs second detection accuracy data indicating the high detection accuracy of the second observation data to the second reliability obtaining unit 10.

The first reliability obtaining unit 9 sets the reliability data P(1) to a value indicating high reliability of the first observation data based on the first detection accuracy data indicating the high detection accuracy of the first observation data. The first reliability obtaining unit 9 then outputs the reliability data P(1) to the likelihood combining unit 5.

The second reliability obtaining unit 10 sets the reliability data P(2) to a value indicating high reliability of the second observation data based on the second detection accuracy data indicating the high detection accuracy of the second observation data. The second reliability obtaining unit 10 then outputs the reliability data P(2) to the likelihood combining unit 5.

For ease of explanation, when the state estimation apparatus 2000 is in a bright environment, the first reliability obtaining unit 9 sets the reliability data P(1) for the first observation data to 1, whereas the second reliability obtaining unit 10 sets the reliability data P(2) for the second observation data to 1. More specifically, the reliability data is written as

P(1)=P(2)=1.

Figure 13:
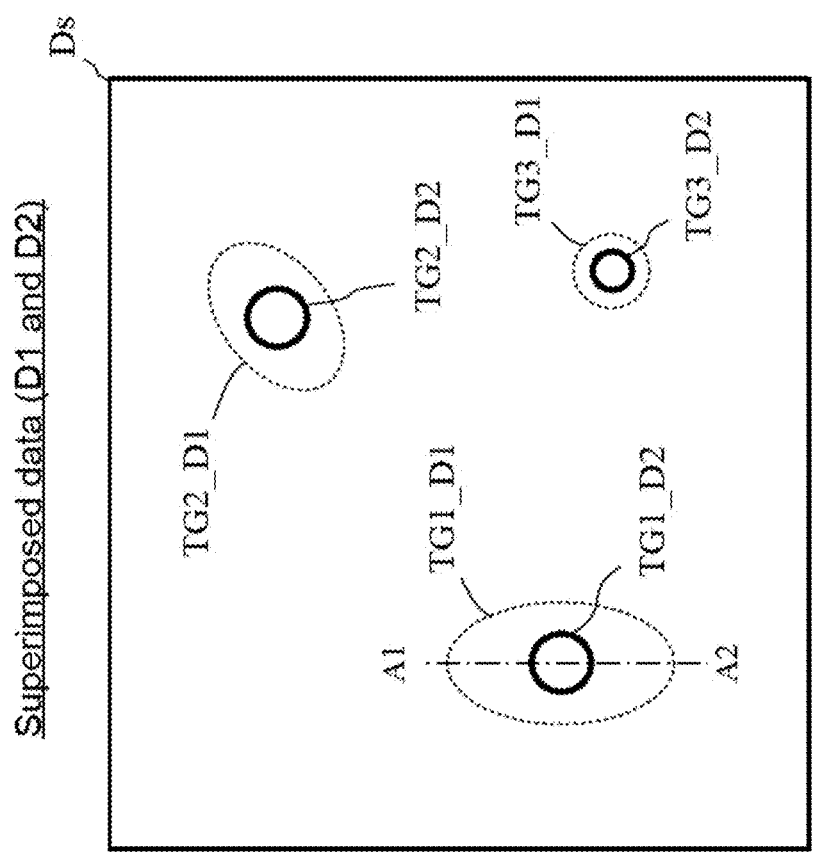
FIG. 13 is a schematic diagram showing the first observation data D1 (image data D1 corresponding to first observation data) and the second observation data D2 (image data D2 corresponding to second observation data) that are superimposed on each other.

FIG. 13 is a schematic diagram showing the first observation data D1 (image data D1 corresponding to first observation data) and the second observation data D2 (image data D2 corresponding to second observation data) that are superimposed on each other.

Figure 14:
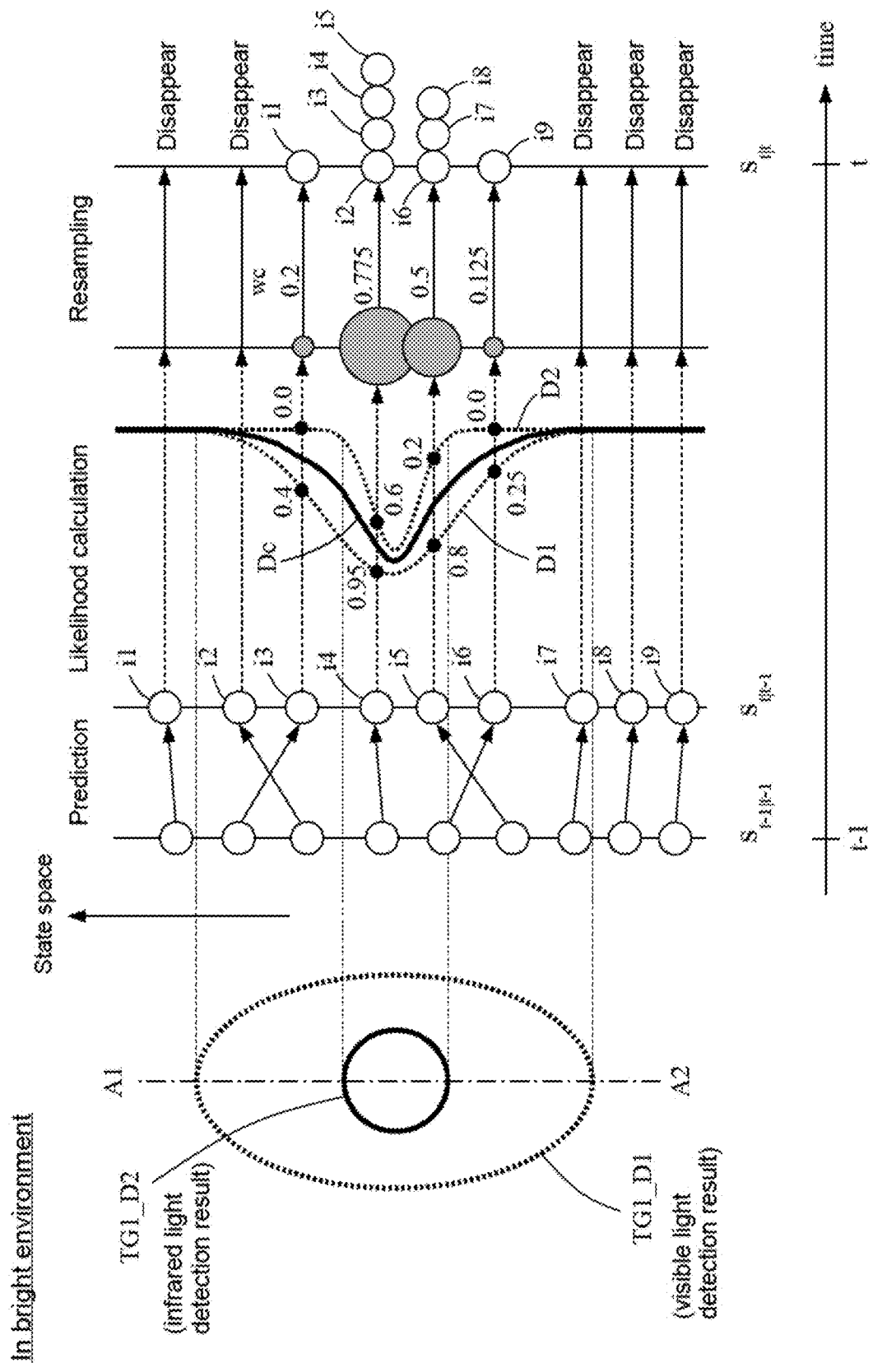
FIG. 14 is a diagram describing a predicting process, a likelihood obtaining (likelihood calculation) process, and a resampling process for an object TG1 as an observation target (tracking target) performed when the state estimation apparatus 2000 is in a bright environment.

FIG. 14 is a diagram describing a predicting process, a likelihood obtaining (likelihood calculation) process, and a resampling process for an object TG1 as an observation target (tracking target) performed when the state estimation apparatus 2000 is in a bright environment. FIG. 14 is a schematic diagram showing particles in the vertical direction (Y-direction). In more detail, FIG. 14 is a schematic diagram showing particles arranged on straight line A1-A2 in the vertical direction in FIG. 13. FIG. 14 also shows curve D1 indicating the values of the first observation data D1 (the pixel values of the image D1) along straight line A1-A2 and curve D2 indicating the values of the second observation data D2 (the pixel values of the image D2) along straight line A1-A2. In FIG. 14, the curves D1 and D2 indicate larger pixel values (values in the positive direction) toward the left.

The processing in FIG. 14 is similar to the processing in FIG. 6 described in the first embodiment.

More specifically, the likelihood combining unit 5 combines the first likelihood w1 with the second likelihood w2 for each particle obtained in accordance with the predictive probability distribution data $S_{t|t-1}$ to obtain a combined likelihood wc. In more detail, when is the combined likelihood value of the i-th particle, the likelihood combining unit 5 obtains the combined likelihood value $wc^{(i)}$ of the i-th particle with the formula below.

$$wc^{(i)}=P(1)/\{P(1)+P(2)\}\times w1^{(i)}+P(2)/\{P(1)+P(2)\}\times w2^{(i)}$$

In FIG. 14, the curve Dc is plotted using the combined likelihood wc obtained as described above.

In the example shown in FIG. 14, the likelihood combining unit 5 obtains the combined likelihood value $wc^{(i)}$ of the i-th particle with the formulas below.

$$wc^{(i1)} = wc^{(i2)} = wc^{(i7)} = wc^{(i8)} = wc^{(i9)} = 0$$

$$\begin{aligned}wc^{(i3)} &= 0.5 \times w1^{(i3)} + 0.5 \times w2^{(i3)} \\ &= 0.5 \times 0.4 + 0.5 \times 0.0 \\ &= 0.2\end{aligned}$$

$$\begin{aligned}wc^{(i4)} &= 0.5 \times w1^{(i4)} + 0.5 \times w2^{(i4)} \\ &= 0.5 \times 0.95 + 0.5 \times 0.6 \\ &= 0.775\end{aligned}$$

$$\begin{aligned}wc^{(i5)} &= 0.5 \times w1^{(i5)} + 0.5 \times w2^{(i5)} \\ &= 0.5 \times 0.8 + 0.5 \times 0.2 \\ &= 0.5\end{aligned}$$

$$\begin{aligned}wc^{(i6)} &= 0.5 \times w1^{(i5)} + 0.5 \times w2^{(i5)} \\ &= 0.5 \times 0.25 + 0.5 \times 0.0 \\ &= 0.125\end{aligned}$$

The combined likelihood obtained as described above (data including the combined likelihood value of each particle) is output from the likelihood combining unit 5 to the posterior probability distribution obtaining unit 6.

The posterior probability distribution obtaining unit 6 obtains (estimates) the posterior probability distribution (posterior probability distribution data) based on the combined likelihood wc and the predictive probability distribution data.

The posterior probability distribution obtaining unit 6 samples M1 particles without changing the total number of the particles at the ratio proportional to the combined likelihood $wc^{(i)}$ of the object TG1 at time t (samples the particle $xa_t^{(i)}$, or the i-th particle of the object TG1).

In the example shown in FIG. 14, nine particles are sampled on straight line A1-A2 included in the image area TG1_D1.

The i3-rd particle obtained in accordance with the predictive probability distribution data $S_{t|t-1}$ is used to obtain the combined likelihood $wc^{(i3)}$ of 0.2. Based on the proportional distribution, one particle is sampled at the position of the i3-rd particle obtained in accordance with the predictive probability distribution data $S_{t|t-1}$. More specifically, the i1-st particle obtained in accordance with the posterior probability distribution data $S_{t|t}$ is sampled.

The i4-th particle obtained in accordance with the predictive probability distribution data $S_{t|t-1}$ is used to obtain the combined likelihood $wc^{(i4)}$ of 0.775. Based on the proportional distribution, four particles are sampled at the position of the i4-th particle obtained in accordance with the predictive probability distribution data $S_{t|t-1}$. More specifically, the i2-nd to i5-th particles, or four particles in total obtained in accordance with the posterior probability distribution data $S_{t|t}$, are sampled.

The i5-th particle obtained in accordance with the predictive probability distribution data $S_{t|t-1}$ is used to obtain the combined likelihood $wc^{(i5)}$ of 0.5. Based on the proportional distribution, three particles are sampled at the position of the i5-th particle obtained in accordance with the predictive probability distribution data $S_{t|t-1}$. More specifically, the i6-th to i8-th particles, or three particles in total obtained in accordance with the posterior probability distribution data $S_{t|t}$, are sampled.

The i6-th particle obtained in accordance with the predictive probability distribution data $S_{t|t-1}$ is used to obtain the combined likelihood $wc^{(i6)}$ of 0.125. Based on the proportional distribution, one particle is sampled at the position of the i6-th particle obtained in accordance with the predictive probability distribution data $S_{t|t-1}$. More specifically, the i9-th particle obtained in accordance with the posterior probability distribution data $S_{t|t}$ is sampled.

As described above, when the state estimation apparatus 2000 is in a bright environment, the posterior probability distribution obtaining unit 6 samples M1 particles without changing the total number of the particles at the ratio proportional to the combined likelihood $wc^{(i)}$ of the object TG1 at time t (samples the particle $xa_t^{(i)}$, or the i-th particle of the object TG1).

The first reliability obtaining unit 9 may chronologically and continuously obtain (monitor) the first detection accuracy data output from the first observation obtaining unit 1A, and lower the value of the reliability data P(1) (to a value indicating low reliability) when the value of the first detection accuracy data falls out of a predetermined range. The second reliability obtaining unit 10 may chronologically and continuously obtain (monitor) the second detection accuracy data output from the second observation obtaining unit 2A, and lower the value of the reliability data P(2) (to a value indicating low reliability) when the value of the second detection accuracy data falls out of a predetermined range.

2.2.2 when State Estimation Apparatus 2000 is in Dark Environment

The processing performed when the state estimation apparatus 2000 is in a dark environment will now be described.

In this case, the input data Din1, which is a moving image obtained by the imaging apparatus including the visible light image sensor (captured moving image), has low accuracy, whereas the input data Din2, which is a moving image obtained by the imaging apparatus including the infrared image sensor (captured moving image), has high accuracy.

As a result, the first observation data D1 obtained by the first observation obtaining unit 1A has low accuracy, whereas the second observation data D2 obtained by the second observation obtaining unit 2A has high accuracy.

In this case, the first observation obtaining unit 1A outputs first detection accuracy data indicating the low detection accuracy of the first observation data to the first reliability obtaining unit 9. The second observation obtaining unit 2A outputs second detection accuracy data indicating the high detection accuracy of the second observation data to the second reliability obtaining unit 10.

The first reliability obtaining unit 9 sets the reliability data P(1) to a value indicating low reliability of the first observation data based on the first detection accuracy data indicating the low detection accuracy of the first observation data. The first reliability obtaining unit 9 then outputs the reliability data P(1) to the likelihood combining unit 5. In this example, the first reliability obtaining unit 9 sets the reliability data as

P(1)=0.

The second reliability obtaining unit 10 sets the reliability data P(2) to a value indicating high reliability of the second observation data based on the second detection accuracy data indicating the high detection accuracy of the second observation data. The second reliability obtaining unit 10 then outputs the reliability data P(2) to the likelihood combining unit 5. In this example, the second reliability obtaining unit 10 sets the reliability data as

P(2)=1.

Figure 15:
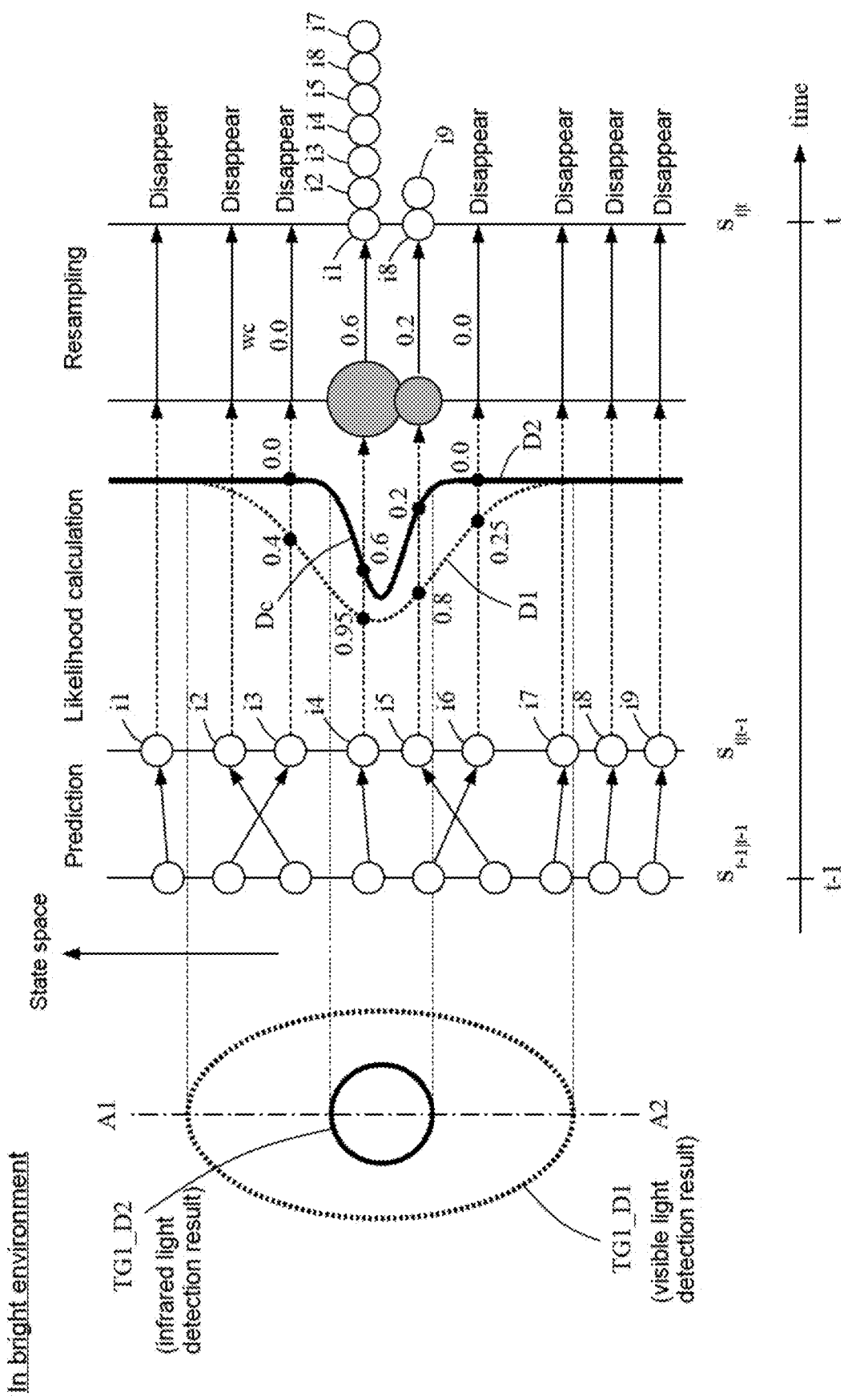
FIG. 15 is a diagram describing a predicting process, a likelihood obtaining (likelihood calculation) process, and a resampling process for the object TG1 as an observation target (tracking target) performed when the state estimation apparatus 2000 is in a dark environment.

FIG. 15 is a diagram describing a predicting process, a likelihood obtaining (likelihood calculation) process, and a resampling process for an object TG1 as an observation target (tracking target) performed when the state estimation apparatus 2000 is in a dark environment. FIG. 15 is a schematic diagram showing particles in the vertical direction (Y-direction). In more detail, FIG. 15 is a schematic diagram showing particles arranged on straight line A1-A2 in the vertical direction in FIG. 13. FIG. 15 also shows curve D1 indicating the values of the first observation data D1 (the pixel values of the image D1) along straight line A1-A2 and curve D2 indicating the values of the second observation data D2 (the pixel values of the image D2) along straight line A1-A2. In FIG. 15, the curves D1 and D2 indicate larger pixel values (values in the positive direction) toward the left.

In the example shown in FIG. 15, the likelihood combining unit 5 combines the first likelihood w1 with the second likelihood w2 for each particle obtained in accordance with the predictive probability distribution data $S_{t|t-1}$ to obtain a combined likelihood wc. In more detail, when $wc^{(i)}$ is the combined likelihood value of the i-th particle, the likelihood combining unit 5 obtains the combined likelihood value $wc^{(i)}$ of the i-th particle with the formula below, where P(1)=0 and P(2)=1.

$$wc^{(i)} = P(1)/\{P(1) + P(2)\} \times w1^{(i)} +$$
$$P(2)/\{P(1) + P(2)\} \times w2^{(i)}$$
$$= w2^{(i)}$$

In FIG. 15, the curve Dc is plotted using the combined likelihood we obtained as described above. As shown in FIG. 15, the curve Dc matches the curve D2 (the curve plotted using second likelihood values).

In the example shown in FIG. 15, the likelihood combining unit 5 obtains the combined likelihood value $wc^{(i)}$ of the i-th particle with the formulas below.

$$wc^{(i1)} = wc^{(i2)} = wc^{(i3)} = wc^{(i6)} = wc^{(i7)} = wc^{(i8)} = wc^{(i9)} = 0$$

$$wc^{(i4)} = w2^{(i4)} = 0.6$$

$$wc^{(i5)} = W2^{(i5)} = 0.2$$

The combined likelihood obtained as described above (data including the combined likelihood value of each particle) is output from the likelihood combining unit 5 to the posterior probability distribution obtaining unit 6.

The posterior probability distribution obtaining unit 6 obtains (estimates) the posterior probability distribution (posterior probability distribution data) based on the combined likelihood we and the predictive probability distribution data.

The posterior probability distribution obtaining unit 6 samples M1 particles without changing the total number of the particles at the ratio proportional to the combined likelihood $wc^{(i)}$ of the object TG1 at time t (samples the particle $xa_t^{(i)}$, or the i-th particle of the object TG1).

In the example shown in FIG. 15, nine particles are sampled on straight line A1-A2 included in the image area TG1_D1.

The i4-th particle obtained in accordance with the predictive probability distribution data $S_{t|t-1}$ is used to obtain the combined likelihood $wc^{(i4)}$ of 0.6. Based on the proportional distribution, seven particles are sampled at the position of the i4-th particle obtained in accordance with the predictive probability distribution data $S_{t|t-1}$. More specifically, the i 1-st to i7-th particles obtained in accordance with the posterior probability distribution data $S_{t|t}$ are sampled.

The i5-th particle obtained in accordance with the predictive probability distribution data $S_{t|t-1}$ is used to obtain the combined likelihood $wc^{(i5)}$ of 0.2. Based on the proportional distribution, two particles are sampled at the position of the i5-th particle obtained in accordance with the predictive probability distribution data $S_{t|t-1}$. More specifically, the i8-th to i9-th particles, or two particles in total obtained in accordance with the posterior probability distribution data $S_{t|t}$, are sampled.

As described above, when the state estimation apparatus 2000 is in a dark environment, the posterior probability distribution obtaining unit 6 samples M1 particles without changing the total number of the particles at the ratio proportional to the combined likelihood $wc^{(i)}$ of the object TG1 at time t (samples the particle $xa_t^{(i)}$, or the i-th particle of the object TG1).

The posterior probability distribution obtaining unit 6 obtains a set of samples (a set of particles) $S_{t|t}$ (posterior probability distribution data $S_{t|t}$) in accordance with the posterior probability distribution $p(x_t|y_t)$ at time t from the distribution of the sampled M1 particles written as $$S_{t|t} = \{s_{t|t}^{(1)}, s_{t|t}^{(2)}, \ldots, s_{t|t}^{(M1)}\}.$$

The posterior probability distribution obtaining unit 6 outputs the estimated (obtained) posterior probability distribution (posterior probability distribution data) from the state estimation apparatus 2000. The posterior probability distribution obtaining unit 6 also outputs the distribution data to the prior probability distribution prediction unit 7.

The prior probability distribution prediction unit 7 performs prediction in the same manner as described above using the posterior probability distribution (posterior probability distribution data) at time t input from the posterior probability distribution obtaining unit 6 as the prior probability distribution data at the next time t+1.

Subsequently, the state estimation apparatus 2000 repeats the processing described above.

In comparison between FIGS. 14 and 15, the processing shown in FIG. 15 involves more sampled particles concentrating in the image area TG1_D2 than in FIG. 14.

This is because the state estimation apparatus 2000 in a dark environment uses the second observation data D2 having higher reliability to calculate the combined likelihood wc and performs resampling. More specifically, the state estimation apparatus 2000 calculates the combined likelihood wc based on the reliability data P(1) for the observation data obtained by the first observation obtaining unit 1A and the reliability data P(2) for the observation data obtained by the second observation obtaining unit 2A, and obtains the posterior probability distribution data using the calculated combined likelihood wc.

As described above, the state estimation apparatus 2000 obtains the combined likelihood we based on the observation data with high reliability, thereby obtaining highly accurate posterior probability distribution data $S_{t|t}$. The state estimation apparatus 2000 thus enables more accurate and robust detection and tracking of an object using the highly accurate posterior probability distribution data $S_{t|t}$.

First Modification

A first modification of the second embodiment will now be described.

In this modification, the components that are the same as in the above embodiment will not be described in detail.

In a state estimation apparatus 2000A of this modification, the first observation obtaining unit 1A receives a signal (data) Din1 obtained by an imaging apparatus including a visible light image sensor, whereas the second observation obtaining unit 2A receives a signal (data) Din2 obtained by an imaging apparatus including an infrared image sensor.

Figure 16:
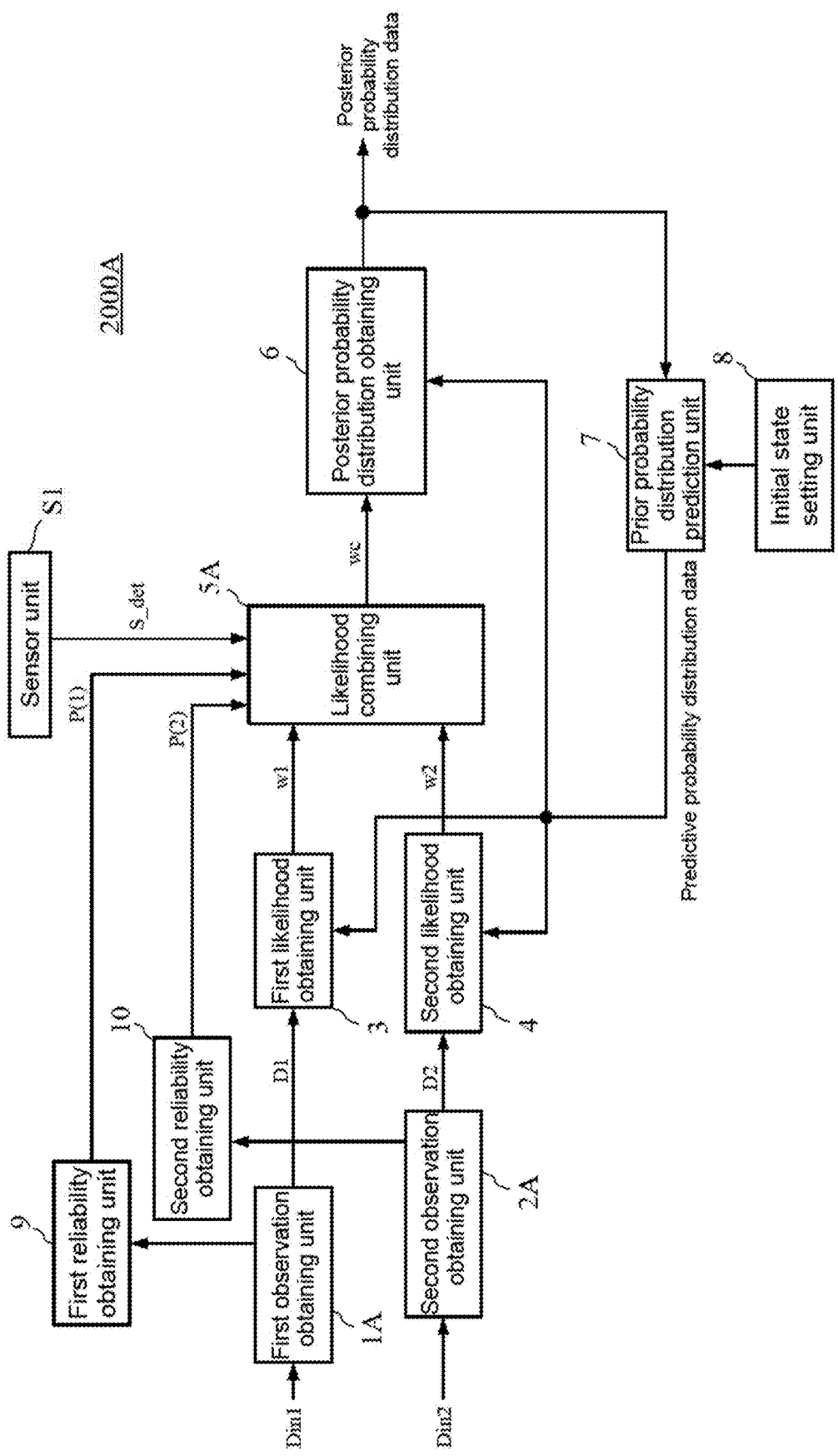
FIG. 16 is a schematic block diagram of a state estimation apparatus 2000A according to a first modification of the second embodiment.

FIG. 16 is a schematic block diagram of the state estimation apparatus 2000A according to the first modification of the second embodiment.

As shown in FIG. 16, the state estimation apparatus 2000A of this modification differs from the state estimation apparatus 2000 according to the second embodiment in that the state estimation apparatus 2000A additionally includes a sensor unit S1, and the likelihood combining unit 5 is replaced with a likelihood combining unit 5A.

The sensor unit S1 obtains a sensor detection value based on detection signals detected by one or more sensors (not shown) (detection signals indicating a predetermined physical quantity detected by the sensors).

The sensor unit S1 may obtain k sensor detection values S_det(i) (i is a natural number, and 1≤i≤k) based on detection signals (sensor detection signals) obtained by k sensors (k is a natural number).

For example, the sensor unit S1 obtains a sensor detection value indicating a temperature obtained by a temperature sensor, and a sensor detection value indicating an illuminance obtained by an illuminance sensor. For ease of explanation, the sensor unit S1 obtains a sensor detection value S_det indicating the illuminance (brightness) of ambient light around the state estimation apparatus 2000A using the illuminance sensor.

The sensor unit S1 outputs the obtained sensor detection value S_det to the likelihood combining unit 5A.

The likelihood combining unit 5A receives the first likelihood w1 output from the first likelihood obtaining unit 3, the second likelihood w2 output from the second likelihood obtaining unit 4, and the sensor detection value S_det output from the sensor unit S1 The likelihood combining unit 5A also receives reliability data P(1) indicating the reliability of the observation data obtained by the first observation obtaining unit 1 and reliability data P(2) indicating the reliability of the observation data obtained by the second observation obtaining unit 2. The likelihood combining unit 5A obtains a combined likelihood wc based on the first likelihood w1, the second likelihood w2, the reliability data P(1) and the reliability data P(2), and the sensor detection value S_det.

For example, the likelihood combining unit 5A obtains corrected reliability data P'(1) based on the sensor detection value S_det and the reliability data P(1). The likelihood combining unit 5A also obtains corrected reliability data P'(2) based on the sensor detection value S_det and the reliability data P(2).

When Lmax is the maximum of the sensor detection value S_det (the maximum illuminance) and Lmin is the minimum of the sensor detection value S_det (the minimum illuminance), the function $f1(x)$ is written as follows:

$$f1(x)=(x-Lmin)/(Lmax-Lmin)$$

where Lmin≤S_det≤Lmax

The likelihood combining unit 5A obtains the corrected reliability data P'(1) and the corrected reliability data P'(2) with the formulas below.

$$P'(1)=f1(S\_det) \times P(1)$$

$$P'(2)=\{1-f1(S\_det)\} \times P(2)$$

The likelihood combining unit 5A also obtains normalized corrected reliability data P''(1) and normalized corrected reliability data P''(2) with the formulas below:

$$P''(1)=P'(1)/(P'(1)+P'(2))$$

$$P''(2)=P'(2)/(P'(1)+P'(2))$$

The likelihood combining unit 5A then obtains a combined likelihood wc with the formula below.

$$wc=P''(1) \times w1+P''(2) \times w2$$

The likelihood combining unit 5A may obtain a combined likelihood wc in the manner described below under the conditions (A) and (B) below.

(A) When P(1)=P(2)=1, and S_det=Lmax (with maximum illuminance), the likelihood combining unit 5A obtains a combined likelihood wc as wc=w1.

In this case, the likelihood combining unit 5A uses the first likelihood w1 obtained based on the signal (data) Din1 obtained by the imaging apparatus including the visible light image sensor as the combined likelihood wc.

(B) When P(1)=P(2)=1, and S_det=Lmin (with minimum illuminance), the likelihood combining unit 5A obtains a combined likelihood wc as wc=w2.

In this case, the likelihood combining unit 5A uses the second likelihood w2 obtained based on the signal (data) Din2 obtained by the imaging apparatus including the infrared image sensor as the combined likelihood wc.

As described above, the likelihood combining unit 5A can obtain the combined likelihood wc using the obtained corrected reliability data P'(1) and P'(2) (or the normalized corrected reliability data P''(1) and P''(2)) based on the sensor detection value S_det indicating the illuminance (brightness) of ambient light around the state estimation apparatus 2000A.

Some examples are described below.

(1) When the illuminance of the ambient light is high (bright environment), the likelihood combining unit 5A obtains the combined likelihood wc based on the signal (data) Din1 obtained by the imaging apparatus including the visible light image sensor, which can obtain more accurate data in a bright environment.

(2) When the illuminance of the ambient light is low (dark environment), the likelihood combining unit 5A obtains the combined likelihood wc based on the signal (data) Din2 obtained by the imaging apparatus including the infrared image sensor, which can obtain more accurate data in a dark environment.

(3) When the illuminance of the ambient light is intermediate (environment with intermediate brightness between environments (1) and (2)), the likelihood combining unit 5A combines the first likelihood w1 of the signal (data) Din1 obtained by the imaging apparatus including the visible light image sensor with the second likelihood w2 of the signal (data) Din2 obtained by the imaging apparatus including the infrared image sensor at, for example, an internal division ratio calculated based on the illuminance. The likelihood combining unit 5A uses the resultant value as the combined likelihood wc.

In this manner, the likelihood combining unit 5A can obtain a more accurate combined likelihood wc reflecting the sensor detection value obtained by the sensor unit S1.

In the above example, the sensor unit S1 obtains the sensor detection value S_det indicating the illuminance (brightness) of ambient light around the state estimation apparatus 2000A using the illuminance sensor. However, the embodiments or modifications should not be limited to this structure. The sensor unit S1 may include a plurality of sensors for obtaining sensor detection values S_det indicating the condition under which the state estimation apparatus 2000A is located as a plurality of sets of data. The likelihood combining unit 5A may then obtain corrected reliability data P'(1) and P'(2) (or normalized corrected reliability data P''(1) and P''(2)) based on the plurality of sets of data obtained by the sensor unit S1 to obtain the combined likelihood wc.

As described above, the state estimation apparatus 2000A of this modification includes various sensors and obtains corrected reliability data P'(1) and corrected reliability data P'(2) (or normalized corrected reliability data P''(1) and P''(2)) by appropriately correcting the reliability data P(1) and the reliability data P(2) based on the sensor detection values obtained by the sensor unit S1. The state estimation apparatus 2000A then obtains a combined likelihood wc based on the obtained corrected reliability data P'(1) and P'(2) (or the normalized corrected reliability data P''(1) and P''(2)).

More specifically, the state estimation apparatus 2000A of this modification can obtain more accurate posterior probability distribution data $S_{t|t}$ using the combined likelihood wc having more appropriate values obtained using the sensor detection values.

The state estimation apparatus 2000A of this modification thus enables more accurate and robust detection and tracking of an object using the more accurate posterior probability distribution data $S_{t|t}$.

Second Modification

A second modification of the second embodiment will now be described.

In this modification, the components that are the same as in the above embodiments will not be described in detail.

In a state estimation apparatus 2000B of this modification, the first observation obtaining unit 1A receives a signal (data) Din1 obtained by an imaging apparatus including a visible light image sensor, whereas the second observation obtaining unit 2A receives a signal (data) Din2 obtained by an imaging apparatus including an infrared image sensor.

Figure 17:
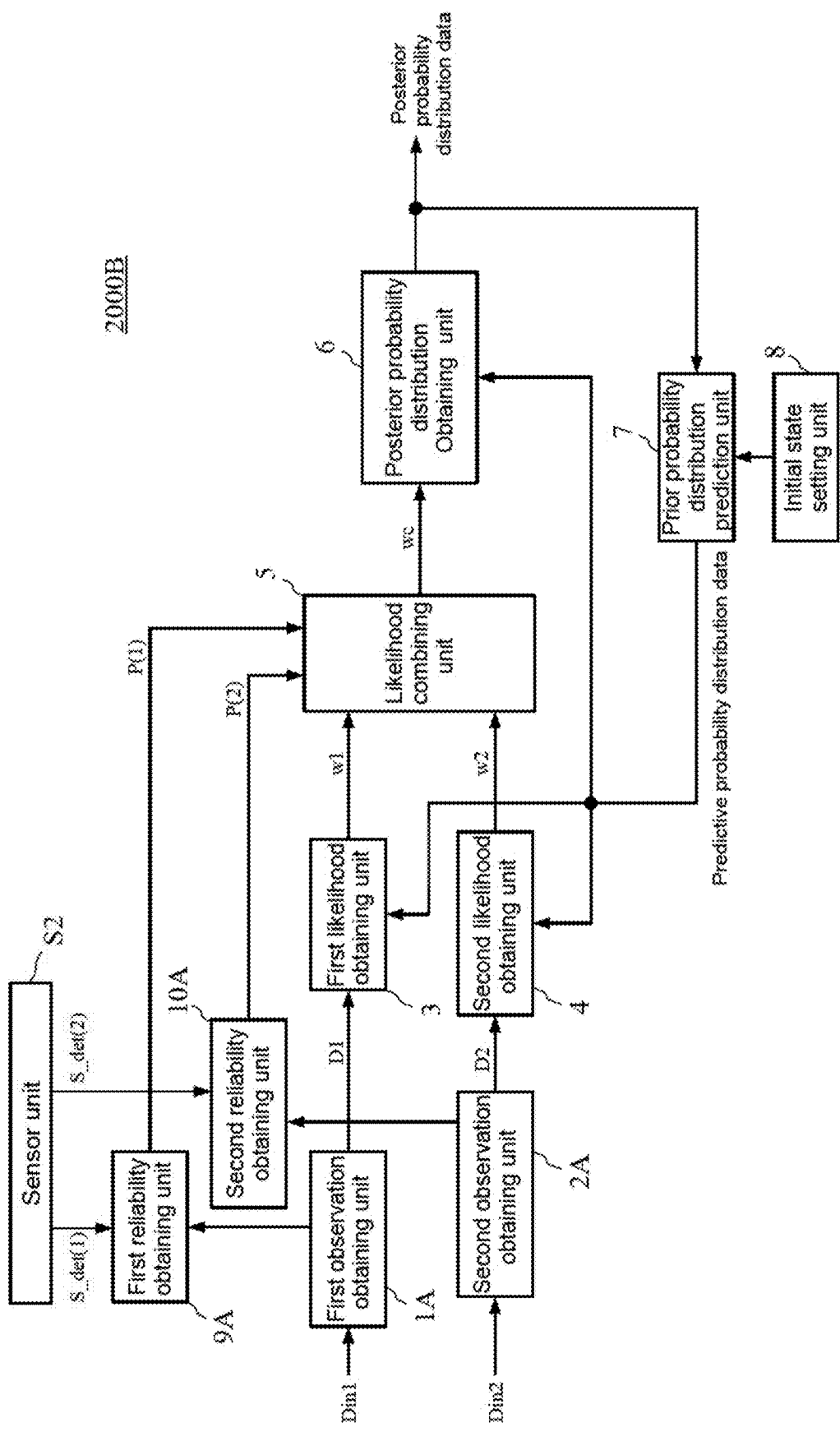
FIG. 17 is a schematic block diagram of a state estimation apparatus 2000B according to a second modification of the second embodiment.

FIG. 17 is a schematic block diagram of the state estimation apparatus 2000B according to the second modification of the second embodiment.

As shown in FIG. 17, the state estimation apparatus 2000B of this modification differs from the state estimation apparatus 2000 according to the second embodiment in that the state estimation apparatus 2000B additionally includes a sensor unit S2, the first reliability obtaining unit 9 is replaced with a first reliability obtaining unit 9A, and the second reliability obtaining unit 10 is replaced with a second reliability obtaining unit 10A.

The sensor unit S2 obtains a sensor detection value based on detection signals detected by one or more sensors (not shown) (detection signals indicating a predetermined physical quantity detected by the sensors).

The sensor unit S2 may obtain k sensor detection values S_det(i) (i is a natural number, and 1≤i≤k) based on detection signals (sensor detection signals) obtained by k sensors (k is a natural number).

For example, the sensor unit S2 obtains a sensor detection value indicating a temperature obtained by a temperature sensor, and a sensor detection value indicating an illuminance obtained by an illuminance sensor. For ease of explanation, the sensor unit S2 obtains a sensor detection value S_det indicating the illuminance (brightness) of ambient light around the state estimation apparatus 2000B using the illuminance sensor.

The sensor unit S2 outputs the obtained sensor detection value S_det to the first reliability obtaining unit 9A as a sensor detection value S_det(1). The sensor unit S2 also outputs the obtained sensor detection value S_det to the second reliability obtaining unit 10A as a sensor detection value S_det(2). In this modification, the sensor detection value S_det(1) and the sensor detection value S_det(2) are the same value (the sensor detection value S_det corresponding to a physical quantity obtained by the illuminance sensor) (S_det=S_det(1)=S_det(2)).

The first reliability obtaining unit 9A receives the first detection accuracy data output from the first observation obtaining unit 1A and the sensor detection value S_det(1) (=S_det) output from the sensor unit S2. Based on the first detection accuracy data and the sensor detection value S_det(1) (=S_det), the first reliability obtaining unit 9A obtains reliability data P(1) indicating the reliability of the observation data obtained by the first observation obtaining unit 1A, and outputs the obtained reliability data P(1) to the likelihood combining unit 5.

The second reliability obtaining unit 10A receives the second detection accuracy data output from the second observation obtaining unit 2A and the sensor detection value S_det(2) (=S_det) output from the sensor unit S2. Based on the second detection accuracy data and the sensor detection value S_det(2) (=S_det), the second reliability obtaining unit 10A obtains reliability data P(2) indicating the reliability of the observation data obtained by the second observation obtaining unit 2A, and outputs the obtained reliability data P(2) to the likelihood combining unit 5.

The processing (one example) performed by the first reliability obtaining unit 9A, the second reliability obtaining unit 10A, and the likelihood combining unit 5 will now be described with reference to FIG. 18.

Figure 18:
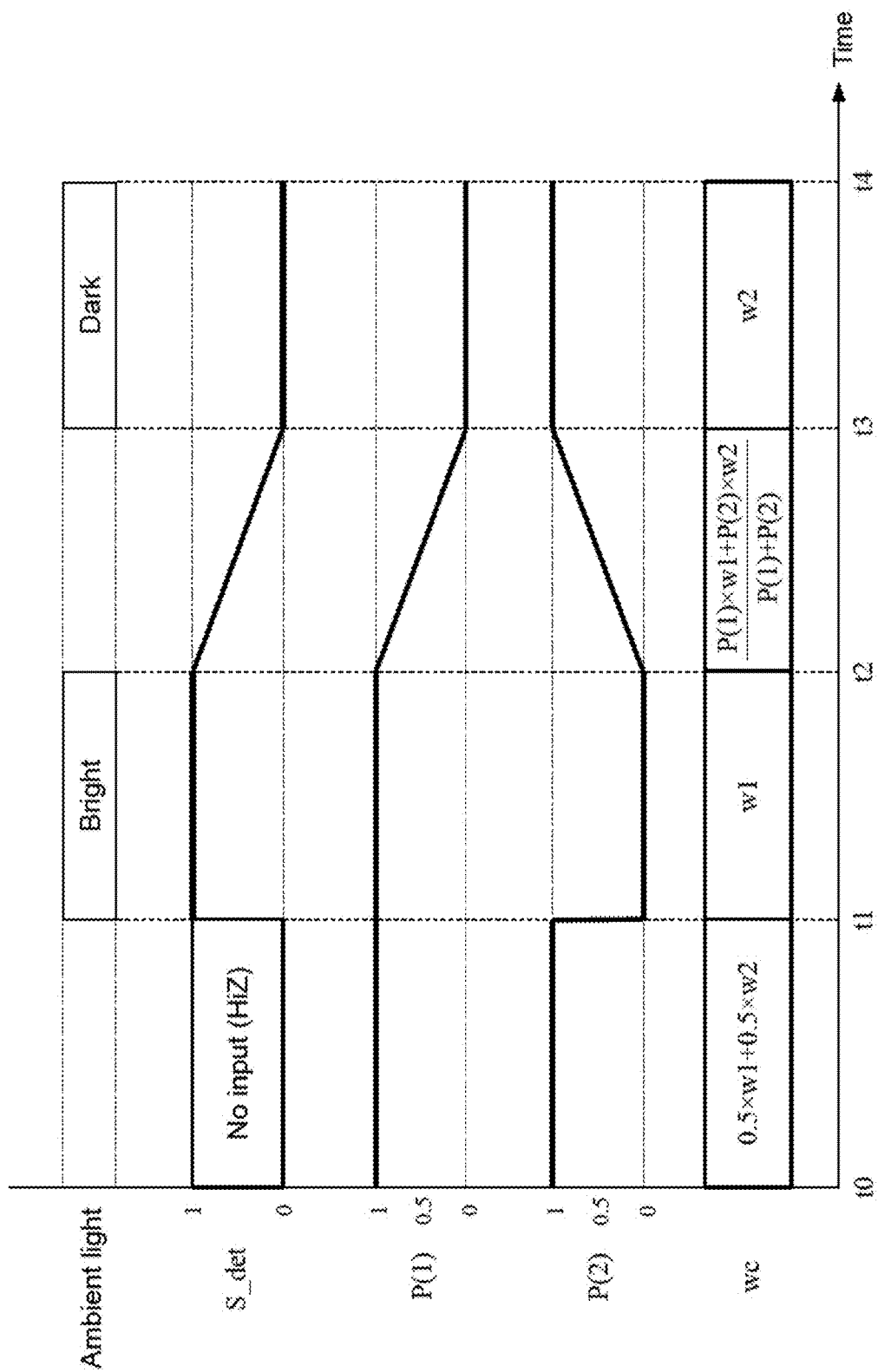
FIG. 18 is a timing chart describing the processing performed by a first reliability obtaining unit 9A, a second reliability obtaining unit 10A, and a likelihood combining unit 5.

FIG. 18 is a timing chart describing the processing performed by the first reliability obtaining unit 9A, the second reliability obtaining unit 10A, and the likelihood combining unit 5. In more detail, FIG. 18 chronologically shows the sensor detection values S_det (=S_det(1)=S_det(2)), the reliability data P(1) and the reliability data P(2), and the combined likelihood wc, in correspondence with the state of ambient light around the state estimation apparatus 2000B.

In the period from times t0 to t1 shown in FIG. 18, the illuminance sensor is not activated and the sensor unit S2 obtains no sensor detection value S_det. At and after time t1, the illuminance sensor operates and the sensor unit S2 obtains the sensor detection value S_det.

The processing performed by the first reliability obtaining unit 9A, the second reliability obtaining unit 10A, and the likelihood combining unit 5 will now be described with reference to the timing chart of FIG. 18.

Times t0 to t1

In the period from times t0 to t1, the first detection accuracy data and the second detection accuracy data have sufficiently high accuracy. In this period from times t0 to t1, the first reliability obtaining unit 9A sets the reliability data P(1) to a value of 1 indicating high reliability based on the first detection accuracy data. The first reliability obtaining unit 9A outputs the set reliability data P(1) to the likelihood combining unit 5. The second reliability obtaining unit 10A sets the reliability data P(2) to a value of 1 indicating high reliability based on the second detection accuracy data. The second reliability obtaining unit 10A outputs the set reliability data P(2) to the likelihood combining unit 5.

The likelihood combining unit 5 combines the first likelihood w1 and the second likelihood w2 after weighting these likelihoods based on the reliability data P(1) and the reliability data P(2) to obtain the combined likelihood wc. For example, the likelihood combining unit 5 obtains the combined likelihood wc by performing the processing corresponding to the formula below.

$$wc = (P(1) \times w1 + P(2) \times w2)/(P(1) + P(2))$$
$$= 0.5 \times w1 + 0.5 \times w2$$

Times t1 to t2

In the period from times t1 to t2, the state estimation apparatus 2000B is in a bright environment. In this case, the sensor unit S2 sets the sensor detection value S_det to a value of 1 indicating high illuminance based on the detection signal obtained by the illuminance sensor. The sensor unit S2 outputs the sensor detection value S_det (=1) to the first reliability obtaining unit 9A and the second reliability obtaining unit 10A. The sensor detection value S_det is set to 0≤S_det 1. The sensor detection value is closer to 1 as the illuminance is higher.

The first reliability obtaining unit 9A obtains the reliability data P(1) based on the first detection accuracy data and the sensor detection value S_det (=1). For example, the first reliability obtaining unit 9A obtains the reliability data P(1) by performing the processing corresponding to the formula below.

$$P(1) = S\_det \times f2(D1)$$

In this formula, f2(Dx) is a function that returns the reliability of data Dx. In this modification, the reliability of the first observation data D1 (using no sensor detection value) is high, and f2(D1)=1. The function f2(Dx) is set to 0≤f2(Dx)≤1. The function f2(Dx) is closer to 1 as the reliability of the data Dx is higher (the same applies hereafter).

The first reliability obtaining unit 9A obtains the reliability data P(1) with the formula below, where f2(D1)=1.

$$P(1) = S\_det \times f2(D1)$$
$$= S\_det$$

The first reliability obtaining unit 9A outputs the obtained reliability data P(1) to the likelihood combining unit 5.

The second reliability obtaining unit 10A obtains the reliability data P(2) based on the second detection accuracy data and the sensor detection value S_det (=1). For example, the second reliability obtaining unit 10A obtains the reliability data P(2) by performing the processing corresponding to the formula below.

$$P(2) = (1 - S\_det) \times f2(D2)$$

In this formula, f2(Dx) is a function that returns the reliability of data Dx. In this modification, the reliability of the second observation data D2 (using no sensor detection value) is assumed to be high, and f2(D2)=1.

The second reliability obtaining unit 10A obtains the reliability data P(2) with the formula below, where f2(D2)=1.

$$P(2) = (1 - S\_det) \times f2(D1)$$
$$= 1 - S\_det$$

The second reliability obtaining unit 10A outputs the obtained reliability data P(2) to the likelihood combining unit 5.

The likelihood combining unit 5 obtains the combined likelihood wc by combining the first likelihood w1 and the second likelihood w2 after weighting these likelihoods based on the reliability data P(1) and the reliability data P(2). For example, the likelihood combining unit 5 obtains the combined likelihood wc by performing the processing corresponding to the formula below.

$$wc = (P(1) \times w1 + P(2) \times w2)/(P(1) + P(2))$$
$$= S\_det \times w1 + (1 - S\_det) \times w2$$

In this formula, S_det=1. The likelihood combining unit 5 thus obtains the combined likelihood wc as wc=w1

As a result, the likelihood combining unit 5 can obtain an appropriate combined likelihood wc depending on the illuminance of ambient light around the state estimation apparatus 2000B.

More specifically, when the illuminance of ambient light around the state estimation apparatus 2000B is sufficiently high, the likelihood combining unit 5 can obtain the first likelihood w1 from the signal (data) Dint obtained by the imaging apparatus including the visible light image sensor, which can obtain more accurate data in a bright environment as the combined likelihood wc.

Times t2 to t3

In the period from times t2 to t3, the state estimation apparatus 2000B is in an environment in which bright ambient light gradually becomes dark. As shown in FIG. 18, the sensor detection value S_det obtained by the sensor unit S2 is 1 at time t2, and linearly decreases from time t2 to time t3 and reaches 0 at time t3.

The first reliability obtaining unit 9A obtains the reliability data P(1) based on the first detection accuracy data and the sensor detection value S_det. For example, the first reliability obtaining unit 9A obtains the reliability data P(1) by performing the processing corresponding to the formula below.

$$P(1) = S\_det \times f2(D1)$$

In this formula, f2(Dx) is a function that returns the reliability of data Dx. In this modification, the reliability of the first observation data D1 (using no sensor detection value) is assumed to be high, and f2(D1)=1.

The first reliability obtaining unit 9A obtains the reliability data P(1) with the formula below, where f2(D1)=1.

$$P(1) = S\_det \times f2(D1)$$
$$= S\_det$$

The first reliability obtaining unit 9A outputs the obtained reliability data P(1) to the likelihood combining unit 5.

The second reliability obtaining unit 10A obtains the reliability data P(2) based on the second detection accuracy data and the sensor detection value S_det. For example, the second reliability obtaining unit 10A obtains the reliability data P(2) by performing the processing corresponding to the formula below.

$$P(2) = (1 - S\_det) \times f2(D2)$$

In this formula, f2(Dx) is a function that returns the reliability of data Dx. In this modification, the reliability of the second observation data D2 (using no sensor detection value) is assumed to be high, and f2(D2)=1.

The second reliability obtaining unit 10A obtains the reliability data P(2) with the formula below, where f2(D2)=1.

$$P(2) = (1 - S\_det) \times f2(D1)$$
$$= 1 - S\_det$$

The second reliability obtaining unit 10A outputs the obtained reliability data P(2) to the likelihood combining unit 5.

The likelihood combining unit 5 obtains the combined likelihood wc by combining the first likelihood w1 and the second likelihood w2 after weighting these likelihoods based on the reliability data P(1) and the reliability data P(2). For example, the likelihood combining unit 5 obtains the combined likelihood wc by performing the processing corresponding to the formula below.

$$wc = (P(1) \times w1 + P(2) \times w2)/(P(1) + P(2))$$
$$= S\_det \times w1 + (1 - S\_det) \times w2$$

As a result, the likelihood combining unit 5 can obtain an appropriate combined likelihood wc depending on the illuminance of ambient light around the state estimation apparatus 2000B.

More specifically, as the illuminance of ambient light around the state estimation apparatus 2000B is higher, the likelihood combining unit 5 can obtain the combined likelihood wc with a larger weight assigned to the first likelihood w1 obtained from the signal (data) Din1 obtained by the imaging apparatus including the visible light image sensor, which can obtain more accurate data in a bright environment.

As the illuminance of ambient light around the state estimation apparatus 2000B is lower, the likelihood combining unit 5 can obtain the combined likelihood wc with a larger weight assigned to the second likelihood w2 obtained from the signal (data) Din2 obtained by the imaging apparatus including the infrared image sensor, which can obtain more accurate data in a dark environment.

Times t3 to t4

In the period from times t3 to t4, the state estimation apparatus 2000B is in a dark environment. In this case, the sensor unit S2 sets the sensor detection value S_det to a value of 0 indicating low illuminance based on the detection signal obtained by the illuminance sensor. The sensor unit S2 outputs the sensor detection value S_det (=0) to the first reliability obtaining unit 9A and the second reliability obtaining unit 10A. The sensor detection value S_det is set to 0≤S≤det 1. The sensor detection value is closer to 1 as the illuminance is higher.

The first reliability obtaining unit 9A obtains the reliability data P(1) based on the first detection accuracy data and the sensor detection value S_det (=0). For example, the first reliability obtaining unit 9A obtains the reliability data P(1) by performing the processing corresponding to the formula below.

$$P(1) = S\_det \times f2(D1)$$

In this formula, f2(Dx) is a function that returns the reliability of data Dx. In this modification, the reliability of the first observation data D1 (using no sensor detection value) is assumed to be high, and f2(D1)=1.

The first reliability obtaining unit 9A obtains the reliability data P(1) with the formula below, where f2(D1)=1.

$$P(1) = S\_det \times f2(D1)$$
$$= S\_det$$

The first reliability obtaining unit 9A outputs the obtained reliability data P(1) to the likelihood combining unit 5.

The second reliability obtaining unit 10A obtains the reliability data P(2) based on the second detection accuracy data and the sensor detection value S_det (=0). For example, the second reliability obtaining unit 10A obtains the reliability data P(2) by performing the processing corresponding to the formula below.

$$P(2) = (1 - S\_det) \times f2(D2)$$

In this formula, f2(Dx) is a function that returns the reliability of data Dx. In this modification, the reliability of the second observation data D2 (using no sensor detection value) is assumed to be high, and f2(D2)=1.

The second reliability obtaining unit 10A obtains the reliability data P(2) with the formula below, where f2(D2)=1.

$$P(2) = (1 - S\_det) \times f2(D1)$$
$$= 1 - S\_det$$

The second reliability obtaining unit 10A outputs the obtained reliability data P(2) to the likelihood combining unit 5.

The likelihood combining unit 5 obtains the combined likelihood wc by combining the first likelihood w1 and the second likelihood w2 after weighting these likelihoods based on the reliability data P(1) and the reliability data P(2). For example, the likelihood combining unit 5 obtains the combined likelihood wc by performing the processing corresponding to the formula below.

$$wc = (P(1) \times w1 + P(2) \times w2)/(P(1) + P(2))$$
$$= S\_det \times w1 + (1 - S\_det) \times w2$$

In this formula, S_det=0. The likelihood combining unit 5 thus obtains the combined likelihood we as wc=w2.

As a result, the likelihood combining unit 5 can obtain an appropriate combined likelihood wc depending on the illuminance of ambient light around the state estimation apparatus 2000B.

More specifically, when the illuminance of ambient light around the state estimation apparatus 2000B is sufficiently low, the likelihood combining unit 5 can obtain the second likelihood w2 from the signal (data) Din2 obtained by the imaging apparatus including the infrared image sensor, which can obtain more accurate data in a dark environment, as the combined likelihood wc.

In the above example, the sensor unit S2 obtains the sensor detection value S_det indicating the illuminance (brightness) of ambient light around the state estimation apparatus 2000B using the illumination sensor. However, the embodiments or modifications should not be limited to this structure. The sensor unit S2 may include a plurality of sensors for obtaining sensor detection values S_det indicating the condition under which the state estimation apparatus 2000B is located as a plurality of sets of data. The likelihood combining unit 5 may then obtain corrected reliability data P'(1) and P'(2) (or normalized corrected reliability data P"(1) and P"(2)) based on the plurality of sets of data obtained by the sensor unit S2 to obtain the combined likelihood wc.

In the above example, the sensor detection value S_det(1) output from the sensor unit S2 to the first reliability obtaining unit 9A is the same as the sensor detection value S_det(2) output from the sensor unit S2 to the second reliability obtaining unit 10A. However, the embodiments or modifications should not be limited to this structure. The sensor detection value S_det(1) output from the sensor unit S2 to the first reliability obtaining unit 9A may be data different from the sensor detection value S_det(2) output from the sensor unit S2 to the second reliability obtaining unit 10A.

As described above, the state estimation apparatus 2000B of this modification includes various sensors, and obtains reliability data P(1) and reliability data P(2) based on the sensor detection values obtained by the sensor unit S2, and obtains the combined likelihood wc based on the obtained reliability data P(1) and P(2). The state estimation apparatus 2000B of this modification can obtain more accurate posterior probability distribution data $S_{t|t}$ using the combined likelihood wc having more appropriate values based on the sensor detection values.

The state estimation apparatus 2000B of this modification thus enables more accurate and robust detection and tracking of an object using the more accurate posterior probability distribution data $S_{t|t}$.

Third Modification

A third modification of the second embodiment will now be described.

Although the state estimation apparatus 2000 according to the second embodiment includes the two observation obtaining units (the first observation obtaining unit 1A and the second observation obtaining unit 2A), the two reliability obtaining units, and the two likelihood obtaining units (the first likelihood obtaining unit 3 and the second likelihood obtaining unit 4), a state estimation apparatus according to the third modification of the second embodiment includes n observation obtaining units, n reliability obtaining units, and n likelihood obtaining units. The state estimation apparatus according to the third modification of the second embodiment performs processing using n likelihoods.

Figure 19:
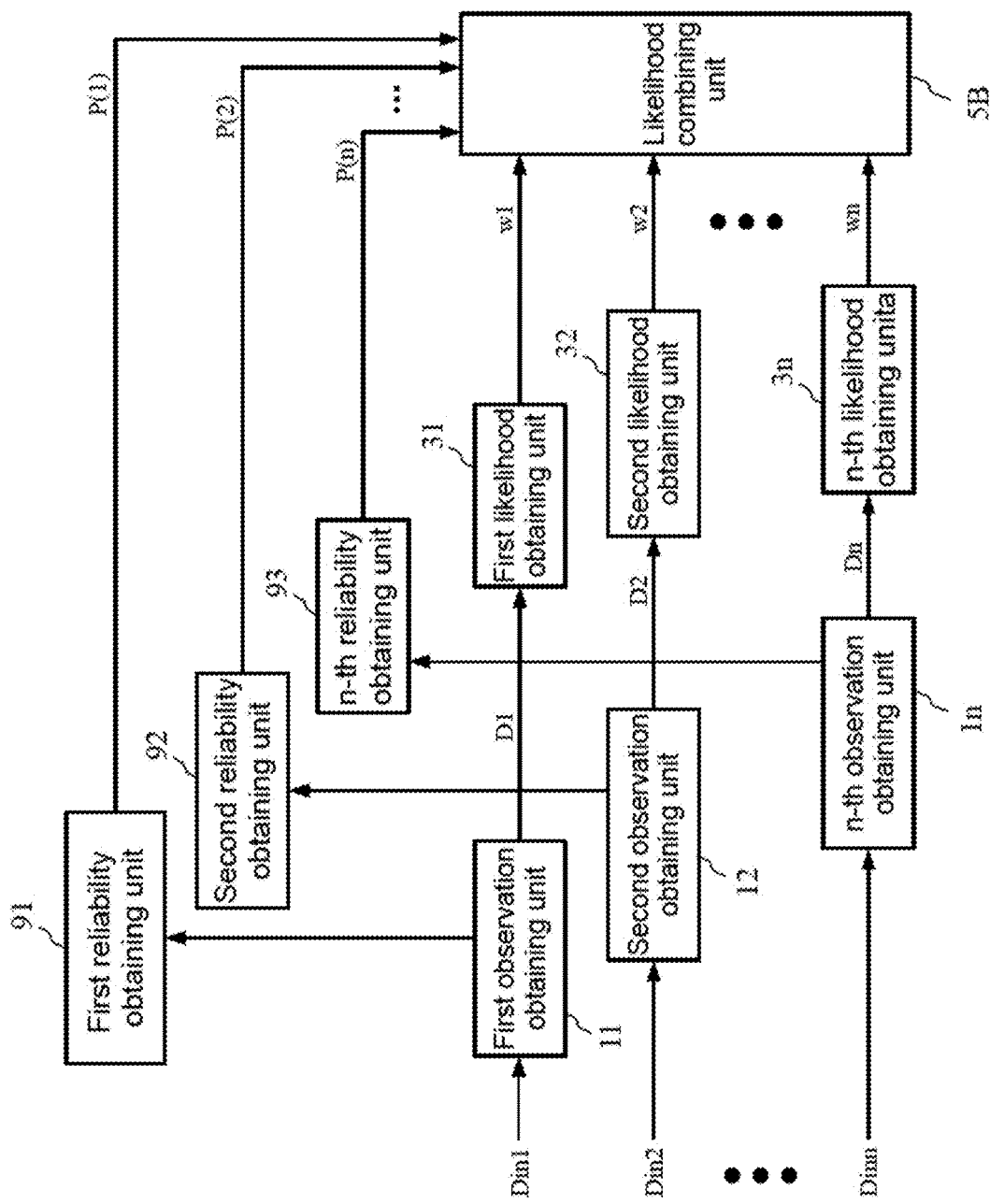
FIG. 19 is a schematic block diagram of a state estimation apparatus according to a third modification of the second embodiment (with multiple inputs) including n observation obtaining units, n likelihood obtaining units, n reliability obtaining units, and a likelihood combining unit 5B.

FIG. 19 is a schematic block diagram of the state estimation apparatus according to this modification. The state estimation apparatus of the present modification includes n observation obtaining units, n likelihood obtaining units, n reliability obtaining units, and a likelihood combining unit 5B.

The likelihood combining unit 5B combines n likelihoods w1 to wn based on n reliability data sets P(1) to P(n) to obtain a combined likelihood wc. For example, the likelihood combining unit 5B obtains the combined likelihood wc in the manner described below.

The likelihood combining unit 5B normalizes the n reliability values to satisfy the formula below.

Formula 3

$$\sum_{i=1}^{n} P(i) = 1 \quad (3)$$

The likelihood combining unit 5B then obtains the combined likelihood wc with the formula below.

Formula 4

$$wc = \sum_{i=1}^{n} P(i) \times w_i \quad (4)$$

The likelihood combining unit may receive a detection signal from a sensor.

Figure 20:
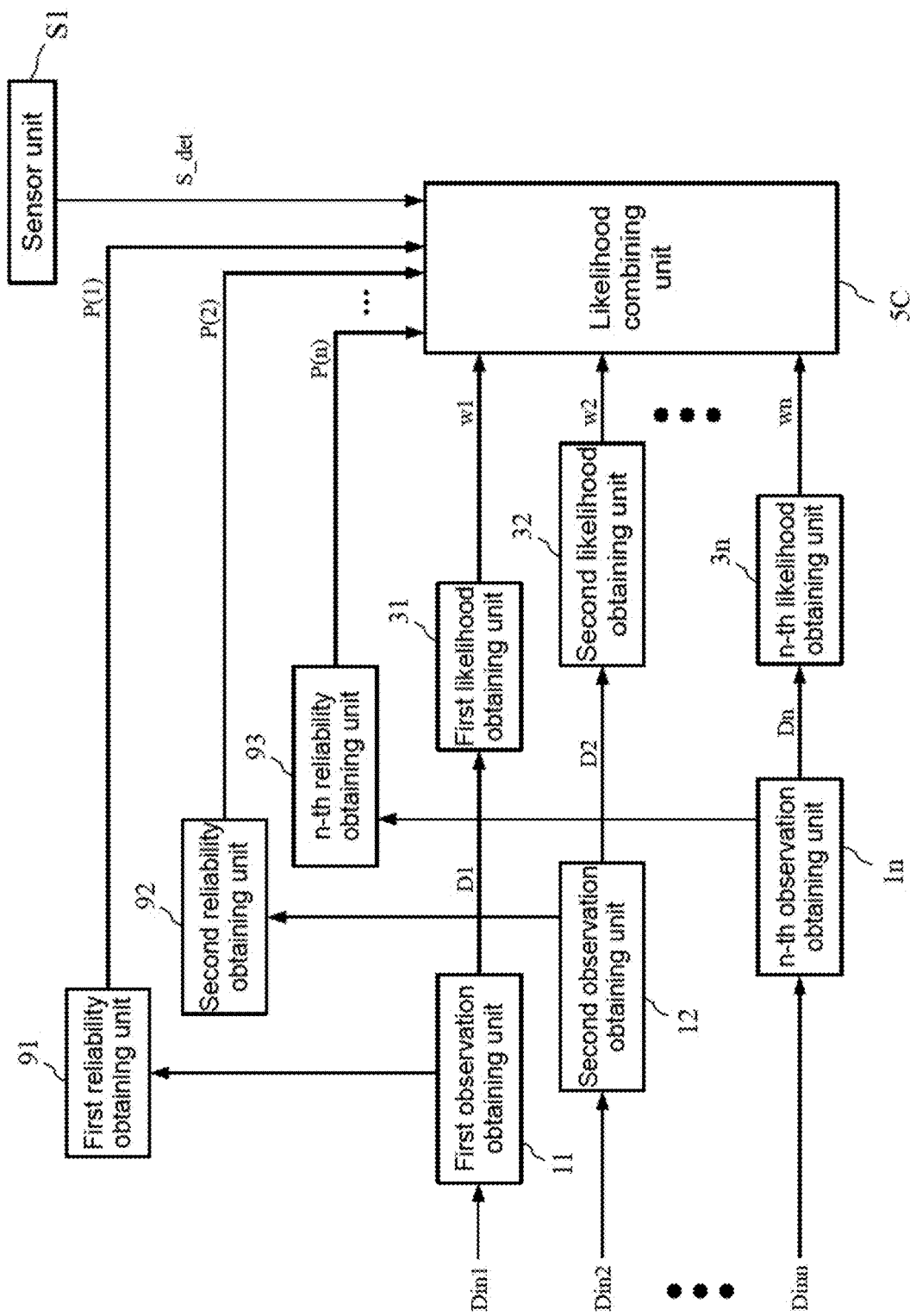
FIG. 20 is a schematic block diagram of a state estimation apparatus according to the third modification of the second embodiment (with multiple inputs) including n observation obtaining units, n likelihood obtaining units, n reliability obtaining units, a likelihood combining unit 5C, and a sensor unit S1.

As shown in FIG. 20, for example, the state estimation apparatus may additionally include a sensor unit S1, and the likelihood combining unit 5B in FIG. 19 may be replaced with a likelihood combining unit 5C. In this state estimation apparatus, the sensor unit S1 may obtain the sensor detection value S_det based on signals detected (sensor detection signals) by sensors including a temperature sensor, an illuminance sensor, a humidity sensor, and a pressure sensor. The likelihood combining unit 5C may change the value of the reliability data P(i) based on the sensor detection value S_det obtained by the sensor unit S1.

For example, a first observation obtaining unit 11 obtains first observation data D1 from image data obtained by an imaging apparatus including a visible light image sensor. A second observation obtaining unit 12 obtains second observation data D2 from image data obtained by an imaging apparatus including an infrared image sensor. When the illuminance sensor determines that the state estimation apparatus is in a dark environment, the likelihood combining unit 5C may lower the value of the reliability data P(1) for the first observation data D1 and increase the value of the reliability data P(2) for the second observation data D2 and use the corrected reliability data P(1) and the corrected reliability data P(2) to obtain the combined likelihood wc.

The likelihood combining unit 5C may include a lookup table (LUT) associating the signal value of the sensor detection signal output from each sensor (e.g., k sensor detection values S_det(i)) (i is a natural number, and $1 \leq i \leq k$) with predetermined reliability data P(i) (i is a natural number, $1 \leq i \leq n$).

When, for example, the signal value of the sensor detection signal from a predetermined sensor exceeds a predetermined value, the likelihood combining unit 5C may correct the value of the corresponding reliability data P(i) using the lookup table.

A k-th reliability obtaining unit (k is a natural number, and $1 \leq k \leq n$) may receive a sensor detection signal.

Figure 21:
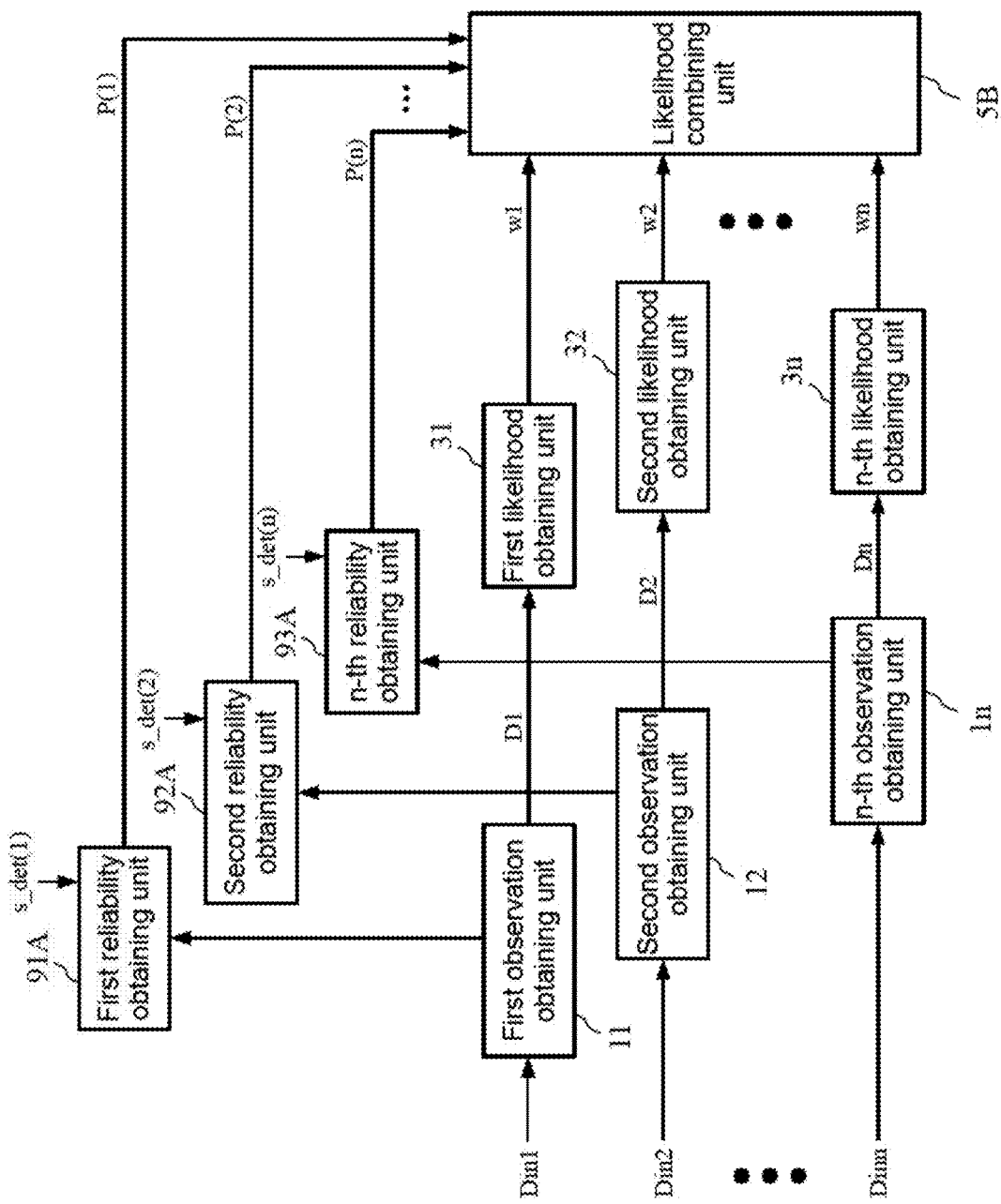
FIG. 21 is a schematic block diagram of the state estimation apparatus according to the third modification of the second embodiment (with multiple inputs) including n observation obtaining units, n likelihood obtaining units, n reliability obtaining units, and a likelihood combining unit 5B.

In the state estimation apparatus shown in FIG. 21, for example, a first reliability obtaining unit 91 in FIG. 19 may be replaced with a first reliability obtaining unit 91A, a second reliability obtaining unit 92 may be replaced with a second reliability obtaining unit 92A, and an n-th reliability obtaining unit 93 may be replaced with an n-th reliability obtaining unit 93A.

In this state estimation apparatus, a sensor unit (not shown in FIG. 21) may obtain sensor detection values S_det based on signals detected by sensors including a temperature sensor, an illuminance sensor, a humidity sensor, and a pressure sensor (sensor detection signals), and outputs the obtained sensor detection values S_det to the first reliability obtaining unit 91A, the second reliability obtaining unit 92A, . . . , and the n-th reliability obtaining unit 93A.

The first reliability obtaining unit 91A obtains reliability data P(1) based on the sensor detection value S_det (S_det (1)) from the sensor unit and the first observation data D1, and outputs the obtained reliability data P(1) to the likelihood combining unit 5B.

The second reliability obtaining unit 92A obtains reliability data P(2) based on the sensor detection value S_det (S_det(2)) from the sensor unit and the second observation data D2, and outputs the obtained reliability data P(2) to the likelihood combining unit 5B The n-th reliability obtaining unit 93A obtains reliability data P(n) based on the sensor detection value S_det (S_det (n)) from the sensor unit and the n-th observation data Dn, and outputs the obtained reliability data P(n) to the likelihood combining unit 5B.

The k-th reliability obtaining unit (k is a natural number, and $1 \leq k \leq n$) may perform the same processing as the processing of the first reliability obtaining unit 9A and the second reliability obtaining unit 10A in the second modification of the second embodiment.

The state estimation apparatus in this modification includes various sensors, and can appropriately correct the reliability data P(i) based on the signal values of sensor detection signals. The state estimation apparatus in this modification can thus obtain a more appropriate combined likelihood we and more accurate posterior probability distribution data $S_{t|t}$.

The state estimation apparatus in this modification thus enables more accurate and robust detection and tracking of an object using the more accurate posterior probability distribution data $S_{t|t}$.

Figure 22:
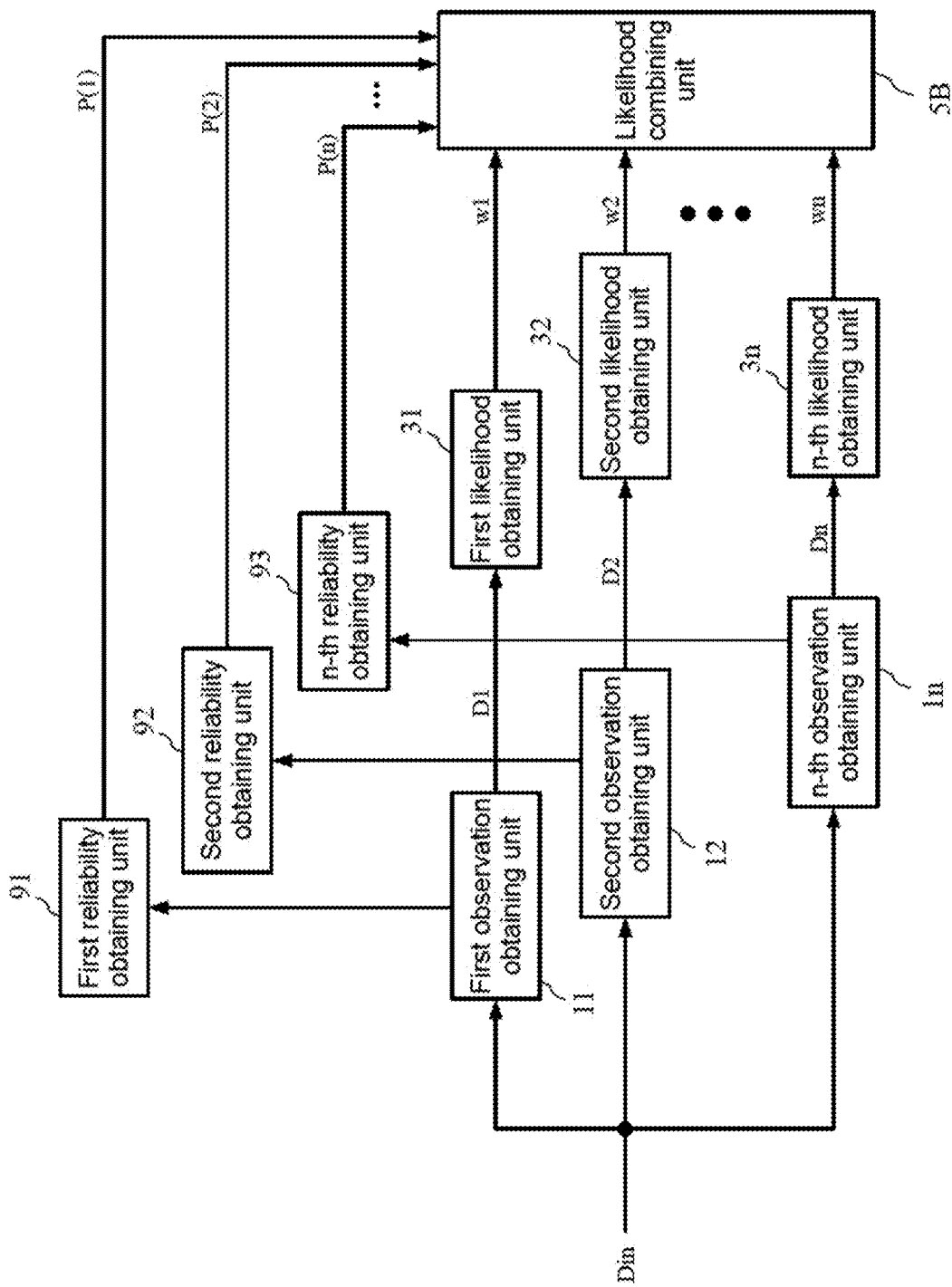
FIG. 22 is a schematic block diagram of the state estimation apparatus according to the third modification of the second embodiment (with one input) including n observation obtaining units, n likelihood obtaining units, n reliability obtaining units, and a likelihood combining unit 5B.

In the above example, the state estimation apparatus of this modification receives n input data sets. However, the embodiments or modifications should not be limited to this structure. As shown in FIG. 22, for example, the state estimation apparatus according to this modification may receive a single input data set Din commonly input into the n observation obtaining units.

Figure 23:
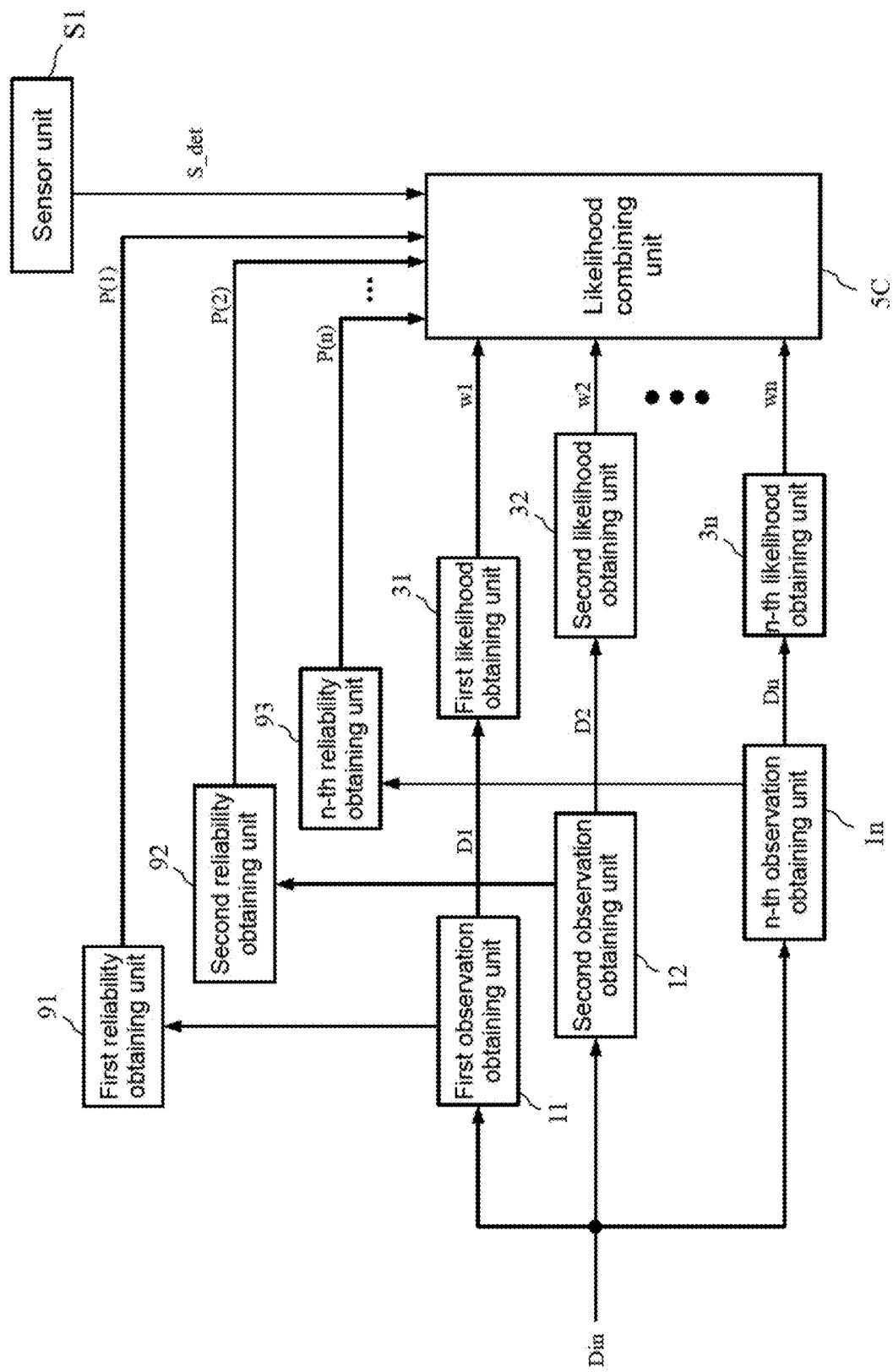
FIG. 23 is a schematic block diagram of the state estimation apparatus according to the third modification of the second embodiment (with one input) including n observation obtaining units, n likelihood obtaining units, n reliability obtaining units, a likelihood combining unit 5C, and a sensor unit S1.

The state estimation apparatus may have the structure shown in FIG. 23. More specifically, the state estimation apparatus shown in FIG. 22 may additionally include a sensor unit S1, and the likelihood combining unit 5B may be replaced with the likelihood combining unit 5C.

Figure 24:
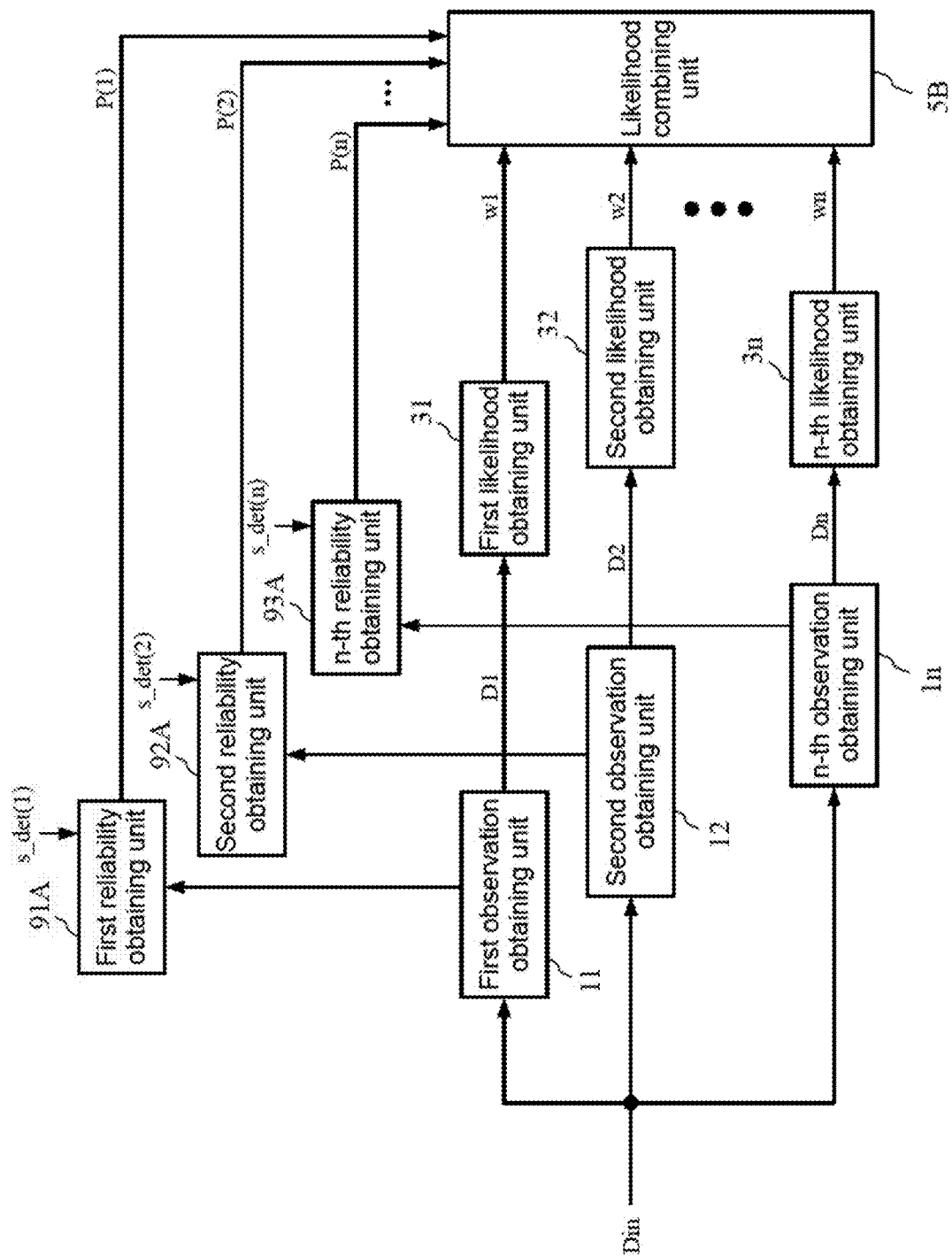
FIG. 24 is a schematic block diagram of the state estimation apparatus according to the third modification of the second embodiment (with one input) including n observation obtaining units, n likelihood obtaining units, n reliability obtaining units, and a likelihood combining unit 5B.

The state estimation apparatus may have the structure shown in FIG. 24. More specifically, the first reliability obtaining unit 91 in the state estimation apparatus shown in FIG. 22 may be replaced with a first reliability obtaining unit 91A, which receives a sensor detection value S_det (S_det (1)) from a sensor unit (not shown). The second reliability obtaining unit 92 may be replaced with a second reliability obtaining unit 92A, which receives a sensor detection value S_det (S_det(2)) from the sensor unit (not shown). The n-th reliability obtaining unit 93 may be replaced with an n-th reliability obtaining unit 93A, which receives a sensor detection value S_det (S_det(n)) from the sensor unit (not shown).

The state estimation apparatus according to this modification may receive k input data sets input individually into k observation obtaining units, and may receive a single input data set commonly input into m observation obtaining units.

The reliability data P(i) may be binary data (e.g., data with a value of 0 or 1), or may be continuous values between 0 and 1 ($0 \leq P(i) \leq 1$).

Other Embodiments

The above embodiments and modifications may be combined to form state estimation apparatuses.

In the above embodiments and modifications, the parameters used in obtaining the likelihoods are parameters defining a rectangular area centered on the coordinate position of the i-th particle ($X_t^{(i)}$, $Y_t^{(i)}$) in the image. The parameters specifically are the coordinate position of the i-th particle ($X_t^{(i)}$, $Y_t^{(i)}$) in the image, and the width W and the height H for defining the rectangular area centered on this coordinate position. However, the embodiments or modifications should not be limited to this structure with the above-described parameters.

For example, the parameters used in obtaining the likelihoods may be parameters defining a circular area having a radius R and centered on the coordinate position ($X_t^{(i)}$ $Y_t^{(i)}$) of the i-th particle in the image. The parameters may specifically be the coordinate position ($X_t^{(i)}$, $Y_t^{(i)}$) of the i-th particle in the image, and the radius R of the circle image area centered on this coordinate position.

In another example, the parameters used in obtaining the likelihoods may be parameters defining an elliptical area having a major axis 2A and a minor axis 2B centered on the coordinate position ($X_t^{(i)}$, $Y_t^{(i)}$) of the i-th particle in the image. The parameters may specifically be the coordinate position ($X_t^{(i)}$, $Y_t^{(i)}$) of the i-th particle in the image, and a value A (half the length of the major axis) and a value B (half the length of the minor axis) of the elliptical image area centered on this coordinate position. The angle θ formed by the major axis or the minor axis with respect to a predetermined direction may be another parameter for defining the elliptical area.

Each block of the state estimation apparatus described in the above embodiments may be formed using a single chip with a semiconductor device, such as an LSI (large-scale integration) device, or some or all of the blocks of the state estimation apparatus may be formed using a single chip.

Although LSI is used as the semiconductor device technology, the technology may be an IC (integrated circuit), a system LSI, a super LSI, or an ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

All or part of the processes performed by the functional blocks described in the above embodiments may be implemented using programs. All or part of the processes performed by the functional blocks described in the above embodiments may be implemented by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semiconductor memory.

The computer program may not be recorded on the recording medium but may be transmitted with an electric communication line, a radio or cable communication line, or a network such as the Internet.

The term "unit" herein may include "circuitry," which may be partly or entirely implemented by using either hardware or software, or both hardware and software.

The specific structures described in the above embodiments of the present invention are mere examples, and may be changed and modified variously without departing from the scope and the spirit of the invention.

APPENDIXES

The present invention may also be expressed in the following forms.

A first aspect of the invention provides a state estimation apparatus for estimating an internal state of an observation target. The apparatus includes a first observation obtaining unit, a second observation obtaining unit, a prior probability distribution prediction unit, a first likelihood obtaining unit, a second likelihood obtaining unit, a likelihood combining unit, and a posterior probability distribution obtaining unit.

The first observation obtaining unit obtains first observation data from an observable event at predetermined time intervals.

The second observation obtaining unit obtains second observation data from the observable event at predetermined time intervals.

The prior probability distribution prediction unit performs prediction using, as prior probability distribution data at current time t, posterior probability distribution data obtained at preceding time t−1 indicating a probability distribution of an internal state of an observation target to obtain predictive probability distribution data indicating a probability distribution of the internal state of the observation target at the current time t.

The first likelihood obtaining unit obtains a first likelihood based on the first observation data.

The second likelihood obtaining unit obtains a second likelihood based on the second observation data.

The likelihood combining unit obtains a combined likelihood based on the first likelihood, the second likelihood, first reliability data indicating reliability of the first observation data, and second reliability data indicating reliability of the second observation data.

The posterior probability distribution obtaining unit obtains posterior probability distribution data indicating a probability distribution of the internal state of the observation target at the current time t from the combined likelihood and the predictive probability distribution data.

This state estimation apparatus obtains a plurality of sets of observation data (e.g., first observation data and second observation data), and combines a plurality of likelihoods (e.g., a first likelihood and a second likelihood) calculated respectively from the plurality of sets of observation data based on the reliability of each set of observation data (e.g., first reliability data and second reliability data) to obtain a combined likelihood. More specifically, this state estimation apparatus obtains a combined likelihood based on observation data with higher reliability, thereby obtaining highly accurate posterior probability distribution data. The state estimation apparatus thus enables more accurate and robust detection and tracking of an object using the highly accurate posterior probability distribution data.

The time may be a time based on the time interval at which an observation target is sampled. For example, time t−1 is a sampling time immediately preceding the sampling time t.

The time interval between the current time t and the next time t+1, or between the preceding time t−1 and the current time may be the time long enough to allow the posterior probability distribution obtaining unit to obtain posterior probability distribution data corresponding to a unit image (e.g., one frame). The interval may be, for example, the time corresponding to one frame (one-frame time).

A second aspect of the invention provides the state estimation apparatus of the first aspect of the invention further including a first reliability obtaining unit and a second reliability obtaining unit.

The first reliability obtaining unit obtains the first reliability data.

The second reliability obtaining unit obtains the second reliability data.

The first observation obtaining unit obtains first detection accuracy data indicating detection accuracy of the first observation data. The second observation obtaining unit obtains second detection accuracy data indicating detection accuracy of the second observation data.

The first reliability obtaining unit obtains the first reliability data based on the first detection accuracy data. The second reliability obtaining unit obtains the second reliability data based on the second detection accuracy data.

This state estimation apparatus obtains a more appropriate combined likelihood based on the first reliability data obtained from the first reliability obtaining unit and the second reliability data obtained from the second reliability obtaining unit. In this state estimation apparatus, for example, the first reliability obtaining unit may chronologically and continuously obtain the first reliability data, and the second reliability obtaining unit may chronologically and continuously obtain the second reliability data, allowing more accurate first reliability data and second reliability data to be obtained. Thus, the state estimation apparatus obtains a combined likelihood based on observation data with higher reliability, thereby obtaining highly accurate posterior probability distribution data. The state estimation apparatus thus enables more accurate and robust detection and tracking of an object using the highly accurate posterior probability distribution data.

A third aspect of the invention provides the state estimation apparatus of the second aspect of the invention further including a sensor unit that obtains one or more sensor detection values based on a predetermined physical quantity that is detected by one or more sensors.

The likelihood combining unit obtains first corrected reliability data by correcting the first reliability data based on the sensor detection value obtained by the sensor unit, and obtains second corrected reliability data by correcting the second reliability data based on the sensor detection value obtained by the sensor unit.

The likelihood combining unit obtains the combined likelihood based on the first corrected reliability data and the second corrected reliability data.

This state estimation apparatus obtains a combined likelihood reflecting a sensor detection value, thereby obtaining more accurate posterior probability distribution data. The state estimation apparatus thus enables more accurate and robust detection and tracking of an object using the highly accurate posterior probability distribution data.

A fourth aspect of the invention provides the state estimation apparatus of the second aspect of the invention further including a sensor unit that obtains one or more sensor detection values based on a predetermined physical quantity that is detected by one or more sensors.

The first reliability obtaining unit obtains the first reliability data based on the sensor detection value obtained by the sensor unit and the first detection accuracy data.

The second reliability obtaining unit obtains the second reliability data based on the sensor detection value obtained by the sensor unit and the second detection accuracy data.

This state estimation apparatus obtains a combined likelihood reflecting a sensor detection value, thereby obtaining more accurate posterior probability distribution data. The state estimation apparatus thus enables more accurate and robust detection and tracking of an object using the highly accurate posterior probability distribution data.

A fifth aspect of the invention provides the state estimation apparatus of one of the first to fourth aspects of the invention in which the first reliability data is a fixed value, and the second reliability data is a fixed value.

This state estimation apparatus can perform a state estimation process using the first reliability data and the second reliability data that are fixed values.

A sixth aspect of the invention provides the state estimation apparatus of one of the first to fifth aspects of the invention in which the first reliability data is binary data, and the second reliability data is binary data.

This state estimation apparatus can perform a state estimation process using the first reliability data and the second reliability data that are binary data.

A seventh aspect of the invention provides the state estimation apparatus of one of the first to fifth aspects of the invention in which the first reliability data is a set of continuous values, and the second reliability data is a set of continuous values.

This state estimation apparatus can perform a state estimation process using the first reliability data and the second reliability data that are sets of continuous values. The state estimation apparatus thus enables more accurate and robust detection and tracking of an object using the highly accurate posterior probability distribution data.

An eighth aspect of the invention provides a state estimation method for estimating an internal state of an observation target. The state estimation method includes a first observation obtaining process, a second observation obtaining process, a prior probability distribution prediction process, a first likelihood obtaining process, a second likelihood obtaining process, a likelihood combining process, and a posterior probability distribution obtaining process.

The first observation obtaining process obtains first observation data from an observable event at predetermined time intervals.

The second observation obtaining process obtains second observation data from the observable event at predetermined time intervals.

The prior probability distribution prediction process performs prediction using, as prior probability distribution data at current time t, posterior probability distribution data obtained at preceding time t−1 indicating a probability distribution of an internal state of an observation target to obtain predictive probability distribution data indicating a probability distribution of the internal state of the observation target at the current time t.

The first likelihood obtaining process obtains a first likelihood based on the first observation data.

The second likelihood obtaining process obtains a second likelihood based on the second observation data.

The likelihood combining process obtains a combined likelihood based on the first likelihood, the second likelihood, first reliability data indicating reliability of the first observation data, and second reliability data indicating reliability of the second observation data.

The posterior probability distribution obtaining process obtains posterior probability distribution data indicating a probability distribution of the internal state of the observation target at the current time t from the combined likelihood and the predictive probability distribution data.

The state estimation method has the same advantageous effects as the state estimation apparatus of the first aspect of the present invention.

A ninth aspect of the invention provides an integrated circuit for estimating an internal state of an observation target. The integrated circuit includes a first observation obtaining unit, a second observation obtaining unit, a prior probability distribution prediction unit, a first likelihood obtaining unit, a second likelihood obtaining unit, a likelihood combining unit, and a posterior probability distribution obtaining unit.

The first observation obtaining unit obtains first observation data from an observable event at predetermined time intervals.

The second observation obtaining unit obtains second observation data from the observable event at predetermined time intervals.

The prior probability distribution prediction unit performs prediction using, as prior probability distribution data at current time t, posterior probability distribution data obtained at preceding time t−1 indicating a probability distribution of an internal state of an observation target to obtain predictive probability distribution data indicating a probability distribution of the internal state of the observation target at the current time t.

The first likelihood obtaining unit obtains a first likelihood based on the first observation data.

The second likelihood obtaining unit obtains a second likelihood based on the second observation data.

The likelihood combining unit obtains a combined likelihood based on the first likelihood, the second likelihood, first reliability data indicating reliability of the first observation data, and second reliability data indicating reliability of the second observation data.

The posterior probability distribution obtaining unit obtains posterior probability distribution data indicating a probability distribution of the internal state of the observation target at the current time t from the combined likelihood and the predictive probability distribution data.

The integrated circuit has the same advantageous effects as the state estimation apparatus of the first aspect of the present invention.

A tenth aspect of the invention provides a non-transitory computer-readable storage medium having stored thereon a program that enables a computer to implement the state estimation method according to the eighth aspect of the invention.

The non-transitory computer-readable storage medium has the same advantageous effects as the state estimation apparatus of the first aspect of the present invention.

What is claimed is:

1. A state estimation apparatus for estimating an internal state of an observation target, the state estimation apparatus comprising:
circuitry including at least a processor and a memory, the circuitry configured to:
obtain first observation data from an observable event at predetermined time intervals;
obtain second observation data from the observable event at predetermined time intervals;
store an initial value for generating prior probability distribution data in an initial state;
in states other than the initial state, perform prediction using, as prior probability distribution data at current time t, posterior probability distribution data obtained at preceding time t−1 indicating a probability distribution of the internal state of the observation target to obtain predictive probability distribution data indicating the probability distribution of the internal state of the observation target at the current time t, wherein the prior probability distribution data is generated based on the initial value during the initial state;
obtain a first likelihood based on the first observation data;
obtain a second likelihood based on the second observation data;
obtain a combined likelihood based on the first likelihood, the second likelihood, first reliability data indicating reliability of the first observation data, and second reliability data indicating reliability of the second observation data;
obtain posterior probability distribution data indicating the probability distribution of the internal state of the observation target at the current time t from the combined likelihood and the predictive probability distribution data;
obtain the first reliability data;
obtain the second reliability data, wherein the circuitry obtains:
first detection accuracy data indicating detection accuracy of the first observation data,
second detection accuracy data indicating detection accuracy of the second observation data,
the first reliability data is based on the first detection accuracy data, and
the second reliability data is based on the second detection accuracy data; and
obtain one or more sensor detection values based on a predetermined physical quantity that is detected by one or more sensors, wherein the circuitry obtains;
first corrected reliability data by correcting the first reliability data based on the sensor detection value obtained,
second corrected reliability data by correcting the second reliability data based on the sensor detection value obtained, and
the combined likelihood based on the first corrected reliability data and the second corrected reliability data.

2. The state estimation apparatus according to claim 1, wherein
the first reliability data is a first fixed value, and
the second reliability data is a second fixed value.

3. The state estimation apparatus according to claim 1, wherein
the first reliability data is binary data, and
the second reliability data is another binary data.

4. The state estimation apparatus according to claim 1, wherein
the first reliability data is a first set of continuous values, and
the second reliability data is a second set of continuous values.

5. A state estimation apparatus for estimating an internal state of an observation target, the state estimation apparatus comprising:
circuitry including at least a processor and a memory, the circuitry configured to:
obtain first observation data from an observable event at predetermined time intervals;
obtain second observation data from the observable event at predetermined time intervals;
store an initial value for generating prior probability distribution data in an initial state;
in states other than the initial state, perform prediction using, as prior probability distribution data at current time t, posterior probability distribution data obtained at preceding time t−1 indicating a probability distribution of the internal state of the observation target to obtain predictive probability distribution data indicating the probability distribution of the internal state of the observation target at the current time t, wherein the prior probability distribution data is generated based on the initial value during the initial state;
obtain a first likelihood based on the first observation data;
obtain a second likelihood based on the second observation data;
obtain a combined likelihood based on the first likelihood, the second likelihood, first reliability data indicating reliability of the first observation data, and second reliability data indicating reliability of the second observation data;
obtain posterior probability distribution data indicating the probability distribution of the internal state of the observation target at the current time t from the combined likelihood and the predictive probability distribution data
obtain the first reliability data;
obtain the second reliability data, wherein the circuitry obtains:
first detection accuracy data indicating detection accuracy of the first observation data,
second detection accuracy data indicating detection accuracy of the second observation data,
the first reliability data is based on the first detection accuracy data, and
the second reliability data is based on the second detection accuracy data; and
obtain one or more sensor detection values based on a predetermined physical quantity that is detected by one or more sensors, wherein the circuitry obtains:
the first reliability data based on the sensor detection value obtained and the first detection accuracy data, and
the second reliability data based on the sensor detection value obtained and the second detection accuracy data.

6. A state estimation method for estimating an internal state of an observation target, the method comprising:
obtaining first observation data from an observable event at predetermined time intervals;
obtaining second observation data from the observable event at predetermined time intervals;
storing an initial value for generating prior probability distribution data in an initial state;
in states other than the initial states, performing prediction using, as prior probability distribution data at current time t, posterior probability distribution data obtained at preceding time t−1 indicating a probability distribution of an internal state of an observation target to obtain predictive probability distribution data indicating a probability distribution of the internal state of the observation target at the current time t, wherein the prior probability distribution data is generated based on the initial value during the initial state;
obtaining a first likelihood based on the first observation data;
obtaining a second likelihood based on the second observation data;

obtaining a combined likelihood based on the first likelihood, the second likelihood, first reliability data indicating reliability of the first observation data, and second reliability data indicating reliability of the second observation data;

obtaining posterior probability distribution data indicating a probability distribution of the internal state of the observation target at the current time t from the combined likelihood and the predictive probability distribution data;

obtaining the first reliability data;

obtaining the second reliability data by obtaining:
    first detection accuracy data indicating detection accuracy of the first observation data,
    second detection accuracy data indicating detection accuracy of the second observation data,
    the first reliability data being based on the first detection accuracy data, and
    the second reliability data being based on the second detection accuracy data; and obtaining one or more sensor detection values based on a predetermined physical quantity that is detected by one or more sensors by obtaining:
    first corrected reliability data by correcting the first reliability data based on the sensor detection value obtained,
    second corrected reliability data by correcting the second reliability data based on the sensor detection value obtained, and
    the combined likelihood based on the first corrected reliability data and the second corrected reliability data.

7. A non-transitory computer-readable storage medium having stored thereon a program that enables a computer to implement the state estimation method according to claim 6.

8. A state estimation method for estimating an internal state of an observation target, the method comprising:

obtaining first observation data from an observable event at predetermined time intervals;

obtaining second observation data from the observable event at predetermined time intervals;

storing an initial value for generating prior probability distribution data in an initial state;

in states other than the initial states, performing prediction using, as prior probability distribution data at current time t, posterior probability distribution data obtained at preceding time t−1 indicating a probability distribution of the internal state of the observation target to obtain predictive probability distribution data indicating the probability distribution of the internal state of the observation target at the current time t, wherein the prior probability distribution data is generated based on the initial value during the initial state;

obtaining a first likelihood based on the first observation data;

obtaining a second likelihood based on the second observation data;

obtaining a combined likelihood based on the first likelihood, the second likelihood, first reliability data indicating reliability of the first observation data, and second reliability data indicating reliability of the second observation data;

obtaining posterior probability distribution data indicating the probability distribution of the internal state of the observation target at the current time t from the combined likelihood and the predictive probability distribution data;

obtaining the first reliability data;

obtaining the second reliability data by obtaining:
    first detection accuracy data indicating detection accuracy of the first observation data,
    second detection accuracy data indicating detection accuracy of the second observation data,
    the first reliability data being based on the first detection accuracy data, and
    the second reliability data being based on the second detection accuracy data;

obtaining one or more sensor detection values based on a predetermined physical quantity that is detected by one or more sensors by obtaining:
    the first reliability data based on the sensor detection value obtained and the first detection accuracy data, and
    the second reliability data based on the sensor detection value obtained and the second detection accuracy data.

9. A non-transitory computer-readable storage medium having stored thereon a program that enables a computer to implement the state estimation method according to claim 8.

* * * * *